US006810779B2

(12) United States Patent
Feldman et al.

(10) Patent No.: US 6,810,779 B2
(45) Date of Patent: Nov. 2, 2004

(54) CRITICAL AREA PREPROCESSING OF NUMERIC CONTROL DATA FOR CUTTING SHEET MATERIAL

(76) Inventors: Vitaly J. Feldman, 93 Wiswall Rd., Newton, MA (US) 02459; Sergio Manevich, 20 Nassau Dr., Winchester, MA (US) 01890

( * ) Notice: Subject to any disclaimer, the term of this patent is extended or adjusted under 35 U.S.C. 154(b) by 167 days.

(21) Appl. No.: 09/727,942

(22) Filed: Mar. 16, 2001

(65) Prior Publication Data

US 2002/0092389 A1 Jul. 18, 2002

(51) Int. Cl.[7] ............................ B26D 1/00; G06F 19/00

(52) U.S. Cl. .................... 83/32; 83/49; 83/56; 700/134

(58) Field of Search .............................. 83/132, 49, 56, 83/75.5, 76.6, 76.9; 700/134, 135, 131; 382/111

(56) References Cited

U.S. PATENT DOCUMENTS

| | | | | | |
|---|---|---|---|---|---|
| 3,495,492 A | | 2/1970 | Gerber et al. | |
| 3,596,068 A | | 7/1971 | Doyle | |
| 3,855,887 A | | 12/1974 | Pearl et al. | |
| 3,864,997 A | | 2/1975 | Pearl et al. | |
| 3,895,358 A | * | 7/1975 | Pearl | 83/76.9 |
| 4,178,820 A | * | 12/1979 | Gerber | 83/76.9 |
| 4,327,615 A | | 5/1982 | Gerber et al. | |
| 4,819,529 A | | 4/1989 | Loriot | |
| 5,027,416 A | * | 6/1991 | Loriot | 382/111 |
| 5,214,590 A | * | 5/1993 | Schnetzer | 83/76.6 |
| 5,418,711 A | * | 5/1995 | Pomerleau et al. | 700/134 |
| 5,663,885 A | * | 9/1997 | Stahl | 700/134 |
| 5,703,781 A | | 12/1997 | Martell et al. | |
| 6,192,777 B1 | * | 2/2001 | Williams et al. | 83/76.6 |
| 6,434,444 B2 | * | 8/2002 | Herman, Jr. | 700/134 |

OTHER PUBLICATIONS

L.Ammeraal, Programming Principles in Computer Grapics, 1992, John Wiley & Sons, pp. 21–27.

Foley, Van Dam, Feiner, Hughes, Computer Graphics and Principles, 1996, Addison–Wesley, 2nd Edition, pp. 117–124.

Mortenson, Geometric Modeling, 1995, John Wiley & Sons, p. 403–413.

K. Weiler. SIGGRAPH 80, v. 14, No. 3, pp. 10–18, 1980.

Milenkovic, Robust Polygon Modeling, Computer Aided Design, 1993, vol. 25, pp. 546–566.

Ronald L. Rardin. Optimization Inoperations Research-.Prentice Hall. Aug. 1997, pp. 827–836.

T.H. Cormen, C.E. Leiserson, R.L. Rivest, Introduction to algorithms, MIT press, Cambridge, 1999, pp. 766–775 and pp. 969–974.

C.H. Papadimitriou, K. Steiglitz, "Combinatorial optimization", Dive Publications, Inc., Mineola, N.Y., 1998, pp. 410–419.

M. Pirlot, "General Local Search Methods", in: European journal of Operational Research, 92, 1996, pp. 493–511.

* cited by examiner

*Primary Examiner*—Stephen Choi
(74) *Attorney, Agent, or Firm*—Mark P. White

(57) ABSTRACT

A method and system of cutting parts from sheet material is disclosed. The system identifies critical segments of the cutting path where cutting difficulties may arise and modifies the data that guide the cutting tool for more accurate cutting through the critical segments. In particular, the system identifies segments of the cutting path proximately close to one another called "common line segments" and generates a optimized cutting path using a single pass to cut common line segments and minimizing total cutting time, including dry haul time. The method and system of the present invention provide an optimal cutting path and control of a cutting tool resulting in higher quality cut pieces and the higher throughput. Therefore, the method disclosed allows for and makes desirable the close nesting of templates without buffers.

16 Claims, 23 Drawing Sheets

CRITICAL AREA PREPROCESSING OF NUMERIC CONTROL DATA FOR CUTTING SHEET MATERIAL

FIELD OF INVENTION

This invention relates to a system and method for numerically controlled cutting of pieces from sheet material, and more specifically for accurately cutting pieces from a closely packed marker.

BACKGROUND OF THE INVENTION—DESCRIPTION OF PRIOR ART

Numerically controlled cutting machines are widely used in various industries for cutting various limp sheet materials such as woven and non-woven fabrics, vinyl and other plastics, paper, cardboard, leather, etc., as well as solid materials like sheet metal, lumber, glass, etc. The cutting tool cuts either a single sheet of material or a stack of multiple sheets (multi-ply layups) under the control of a microprocessor, which is called a numerical controller. An example of such a system for cutting limp sheet material, as disclosed in the U.S. Pat. No. 4,327,615 to Heinz Gerber et al is discussed in the preferred embodiment section of the current invention (see FIG. 1). The numerical controller converts data, written in a specific format, into signals that moves the cutting tool with the given speed along the given tool path, defined by the X, Y and Z coordinates of some reference point of the cutting tool. The numeric control (NC) data define the so-called nesting or layout of pattern pieces, that is the shape and location of the pattern pieces in a marker, the marker being a set of pattern pieces, or templates.

In order to save material, pieces in the marker are routinely positioned closely to each other; frequently touching or even slightly overlapping each other, as shown in FIG. 2. Referring now to FIG. 2, a number of templates 7 are nested together to form a marker 8, which represents the pieces to be cut out of the sheet material.

It is well known in the art that closely nested pieces are much more difficult to cut compared with loosely packed pieces. Situations that create problems when cutting are called "critical" situations; regions within the marker that give rise to critical situations are called "critical", or "sensible" regions; and portions of the tool path (straight line segments and/or points) that are difficult to cut properly are called "critical" or "sensitive" lines, or portions, or segments, or points.

It is well known in the art that cutting problems are most profound near the points of tangency or close approach (FIGS. 3A–3C) and near common lines (FIGS. 4A–4D). The major difference between these two "critical" situations is the magnitude of the angle between the "critical" lines and the length of the portion of a "critical" line that is so close to another "critical" line that cutting this portion of the first line after the previous line has been cut presents a problem (FIG. 5).

To be classified as common lines, the angle between "critical lines" should generally be small, no more than several degrees, while according the U.S. Pat. No. 4,327,615 the angle between tangent lines can be as great as 30 degrees. The "critical" portion of each common line must be, as a rule, much longer, typically several inches or more, while for two tangent lines lengths in the order of tenths of an inch might be enough. It should be mentioned that the common lines geometry could vary from "external" common lines between neighboring pieces, as shown in FIG. 4A to "internal" common lines between overlapping pieces, as shown in FIG. 4B. Referring to FIG. 4A, two templates, 41 and 43, have two sides, 42 and 44, which are in proximity to each other, but do not actually touch. If these sides are within a few tenths of an inch from each other, they may be treated in the same way as if they were common sides. Referring to FIG. 4*b*, two templates, 51 and 53, contain sides 52 and 54, which overlap. Side 52 may be considered internal to template 51, but if the overlap is within the order of a tenth of an inch, this situation may be treated as if the two sides were common. There may exist similar varieties in between these conditions, as shown in FIG. 4C, in which template 61 has side 62 which is actually common with side 63 of template 64 for most of its length. Referring now to FIG. 4D, template 71 contains side 72 which is common with side 74 of template 73, except that in this case the length of commonality is only about one half the length of the longer side 74.

The tangency geometry could vary as well: it can be an "unidirectional" ("one-sided") "tangent" point (FIG. 3A), or a "bi-directional" ("two-sided") "tangent" point (FIG. 3B), both considered in U.S. Pat. No. 3,864,997 to Pearl and Robison, or a point of close approach (not a classical tangent point at all, but in spite of that usually called a "tangent" point anyway), discussed in U.S. Pat. No. 4,327,615 to Gerber (FIG. 3C). In further discussion we usually use the terms "common line" and "tangency" to describe all those varieties, though sometimes, when confusion is possible, we call them "generic common line" and "generic tangent point" ("generic" meaning any variety).

Cutting "critical" lines may result in reduced cut quality and/or even in damaging the cutter. For example, when cutting a limp sheet material a cutting blade severs the limp material as it advances along the cutting path but does not remove the material. As a result, the material is pushed aside by the advancing blade and generally flows around the cutting blade in pressing engagement. This pressure, combined with the ability of the layers of limp material to move against each other, forces the blade to deviate from the programmed line of cut toward the direction of "less resistance". According to Heinz Gerber (U.S. Pat. No. 4,327, 615), "when a cutting blade passes in close proximity to an adjacent pattern piece that was cut at an earlier stage in the operation, the kerf created by the previous cut interrupts the continuity of the limp sheet material and allows the material at one side of the knife blade to yield more easily to the blade than at the opposite side. As a result, the blade experiences unbalanced lateral loading". Apparently, the closer the cutting path approaches the previous cut, the greater the unbalanced loading and the blade bending will be. The blade may eventually break up or jump completely into the kerf of the previous cut. Inaccuracies or damage to the machine are the ultimate consequences.

It is believed that the above-described condition arises for tangent points (including points of close approach) as well as for common lines. That is why it is difficult to cut all of them properly. Cutting one of common lines after the other common line has been cut can also result in frying of the material along the cut, thus resulting in a more severe cutting problem than in the tangency situation, especially when the two common lines are strictly coincident.

Similar problems, though for different reasons, arise when cutting solid materials. For example, cutting a sheet metal may produce extra internal tension, create extra defects, change the planar form of the sheet, and/or modify its elastic properties, etc., depending on the given type of the metal and the chosen cutting tool. All these changes may (and usually do) propagate within some region around the cut. Therefore cutting the metal within this area second time may (and does) result in various cutting problems, specific for each material type/cutting tool combination.

Several approaches have been suggested to overcome the difficulties associated with tangencies and/or points of close approach (FIG. 3) between closely packed pieces.

In U.S. Pat. Nos. 3,855,887 and 3,864,997 Gerber reveals that in such a "critical" cutting area a reciprocal knife blade may be slowed down with reduced feed rate signals and/or rotated out of tangent position with yaw signals, the signals being introduced manually by the cutter operator. In U.S. Pat. No. 4,327,615 Gerber proposes to add slow down and/or yaw command(s) to the NC data with the so-called preprocessing means that is with the help of a computer before feeding the data into the cutter. In addition, the above-mentioned patent suggests adding translation commands to NC data that guide the cutting blade along a path offset slightly from (away) the path at a pattern piece periphery, thus increasing the buffer between pieces within the "critical" region by changing the "critical" portion of the tool path. This approach works well for "critical" regions created by points of tangency or close approach, although changing the direction of the cut, as explained in the U.S. Pat. No. 3,864,997, produces better results when it is applicable.

The current invention resolves a problem which none of the three approaches by Gerber (slowdown, yaw signal or buffer increasing translation) solves, in regard to the cutting of common lines. Slowing the blade down results in diminished throughput, and while slowing down the knife along a short path near the tangent point is acceptable, systematic slowing down along all common line paths is not desirable. Besides, slowing down the knife moderately along the long common line is usually just not enough to avoid complications caused by the accumulation of the unbalanced lateral loading effect during a long path. The application of the yaw signal for a long enough period of time is usually insufficient. Increasing buffers between pieces by decreasing the piece area (buffer increasing translation) may be acceptable for point-like critical situation, where the spatial dimensions of a critical region are small compared with the piece dimensions. However, substantial reduction of the piece area by changing the piece border along the common line when the typical dimensions of the critical region are the same as the dimensions of the piece itself is usually unacceptable (otherwise the piece would have the smaller area from the very beginning).

The inventions revealed in U.S. Pat. No. 3,495,492, U.S. Pat. No. 3,855,887, U.S. Pat. No. 3,864,997, and U.S. Pat. No. 4,327,615, all to Gerber et al., deal with the cutting of pieces that are positioned outside of each other. The boundaries of those pieces can closely approach each other in a critical region of a relatively small size, or even touch each other in a tangent point, but they never overlap each other, the overlapping problem being outside the scope of those inventions. The tool path problems in all those cases are essentially solved by either changing the operation mode of the blade (slowdown, blade spatial orientation, cut direction, etc.), or by changing direction of the cut, or by increasing the buffers by reshaping pieces.

There is another vast area of prior art that is concerned with the cutting of overlapped pieces but does not deal with other tool path problems like cutting a line in a close proximity of a previously cut line. As mentioned by Loriot in U.S. Pat. No. 4,819,529, "in some particular applications it may be acceptable, or indeed desirable, to allow pieces to overlap during placing so long as the overlaps do not significantly spoil the quality of the finished product. For example, this may save raw material. Also, pieces overlaps may be the result of inaccurate placing or of an error in the system for inputting the positions of the pieces when such a system is used in the cutting process."

The U.S. Pat. No. 5,703,781 presents a case where overlapping results from inaccurate placement of the pieces during the first phase of the nesting process and is corrected in the second phase of the said nesting procedure. In the U.S. Pat. No. 5,703,781 Charles Martell et al. reveal an automatic marker making system and method in which the creation of a new marker is facilitated through the use of already existing marker designs. A computer database of existing markers is searched for markers that are "similar" to the marker being created. Initially, position and orientation data from pattern pieces in the "similar" marker are used to position and orient corresponding pieces in the new marker. The new marker is then "compacted" using a software routine to nest all of the new pieces. The compacting routine corrects the overlaps between pieces by moving pieces in the marker without changing the shapes (boundaries, etc.) of the pieces. New positions of pieces are determined by solving a non-linear combinatorial optimization problem with restrictions.

The U.S. Pat. No. 3,596,068 to Doyle reveals a system for optimizing material utilization, where he is using data processing means "to simulate a non-interfering translation of the piece in tangential contact with the marker boundary." Similar to U.S. Pat. No. 5,703,781, he uses translations in order to avoid overlapping, thus reducing the overlapping problem to the problem of nesting.

It is evident that prior art discussed previously strives to remove overlap between pieces by moving pieces, thus reducing the overlap problem to the so-called nesting problem (described, for example, in the U.S. Pat. No. 5,703,781 to Martell et al. and references therein). At the current level of computer technology, any known computer-software solution to the nesting problem, in particular, a solution by Milenkovic et al., cited in the U.S. Pat. No. 5,703,781 appears to produce inferior results compared to the results manually obtained by experienced human operators. Moreover, even if translation successfully corrects overlaps between pieces, it rarely space between pieces and creates "tangencies", "common lines" and all other critical conditions that Gerber et al. were trying to solve in their patents. On the other hand, if translation does create buffers, it wastes the material, which is extremely undesirable, since the cost of the material is the major part of the overall cost of the production.

All prior art discussed so far is devoted to cutting multiply layups of sheet material with an automatic and numerically controlled cutter. The problem of nesting of overlapping pieces is important in many other cutting processes utilizing various cutting machines, including manual cutting of one sheet of a material with a knife by a human worker. It is especially true for cutting hides and leather with natural defects, where overlaps may be acceptable, or indeed desirable, in order to save precious raw material.

For example, in U.S. Pat. No. 4,819,529, Loriot reveals a method, and in particular an automatic method, of cutting parts out from sheet or plate material. The method comprises cutting out parts from sheet or plate material along outlines defined by piece templates; it includes an improvement in which any overlaps between templates are detected and the lines of cut where the templates overlap are modified either by cutting along a straight line interconnecting the points of intersection between the outlines of the overlapping templates, or by cutting along an average line equidistant from the outlines of the templates between the points of intersection of the outlines of the overlapping templates, or else by cutting along the outline of one or other of the overlapping templates, with the type of cut being selected for each overlap zone as a function of the types of the overlapping templates and of the portions of template outlines concerned, the said selections being suitable for storage in a list of possible types of cut, which list may be consulted immediately after detecting and identifying a given overlap. These overlap operations may be performed by a computer. U.S. Pat. No. 4,819,529, similar to the previously discussed U.S. Pat. No. 5,703,781 to Charles Martell et al., does not deal with situations like tangencies or (at least, external or strictly coincident) common lines, probably because those cases are not crucial for manual cutting of one layer of a material. Besides, Loriot's solution results in an undesirable cutting path as soon as overlapping geometry becomes even moderately complex, for example when a line intersects a saw-like boundary. Moreover, Loriot does not even consider the cut sequence in which a new equidistant line must be cut with respect to other lines of the intersecting pieces, thus avoiding the dry haul (moving the blade in the air without actual cutting) and similar optimization problems at all, probably, once more, because the cutting protocol is not important for manual cutting.

In U.S. Pat. No. 3,864,997, Pearl and Robison reveal a system and method for cutting multiple pattern pieces from a layup of sheet material in which contour segments of individual pieces are cut in different directions (clockwise and counterclockwise). The point on any given pattern piece toward which a cutting blade is advanced from different directions is generally the point of closest approach to an adjacent or contiguous pattern piece in the marker. The program generated by the above-identified system also permits certain contour segments to be cut before others. As a result, it allows the tool to approach "sensitive" points, such as a point of tangency or a point closest to the contour of an adjacent piece, from two directions and to alleviate difficulties by making certain cuts before others. The feed rate and tangency of the cutting blade are also regulated at sensitive cutting points such as the points of closest approach to an adjacent pattern piece. When revealing the preferred embodiment of their invention, Pearl and Robison also consider a special cutting situation of strictly coincident common lines, which is illustrated in FIG. 4D where pattern pieces D and E are contiguous between points 78 and 79. In order to save time during the cutting operation and to avoid fraying of the fabric material along the previously cut segment, they discuss two possible solutions: either the "first-takes-all" approach, when the common line segment is omitted entirely from the piece that is cut second; or the "nobody-wins" approach, when the combined profile of pattern pieces D and E is cut in its entirety and then the common contours of the pattern pieces are cut with a single pass. Unfortunately for the industry, these simple and well-known approaches (see, for example, a similar technique mentioned in the U.S. Pat. No. 4,819,529 to Loriot in connection with overlapping) cannot be easily extended to more complex and realistic situations, for example, when common line segments do not strictly coincide, or when more than two pieces have common lines. It must also be mentioned that in the above-discussed case of a "strict common line between two pieces", as a rule, the common line must be cut first, in contrary to the version of "nobody wins" cutting protocol suggested by Pearl and Robison.

Nevertheless, despite all of the above improvements in the prior art, there still remain a number of situations in which the commonly used technique requires manual intervention in the numerical control program. These problem situations typically involve adjacent templates within the marker in which there are points of tangency, and in which there are common lines between adjacent markers.

It is necessary to first detect such circumstances and then to "fix" the detected tool path problems. This detection is generally done in the prior art by a visual inspection of the marker by skilled operators. The operator will then identify portions of the NC program where these problem situations occur, and try to solve the detected tool path problem by manually (interactively) changing the knife path, or manually (interactively) changing the speed of the knife.

It is, accordingly, a major objective of the present invention to provide a system and method to automatically identify and classify critical cutting conditions called generic tangencies (including points of closest approach) and/or generic common lines (internal and/or external, strictly or approximately coincident), and to then automatically guide a cutting blade past such critical cutting conditions without damaging the cutter or substantially sacrificing quality or throughput by automatic preprocessing of data defining a marker.

In accordance with the present invention, whenever a marker consists of pieces that have one or more generic tangencies or generic common lines, the marker is preprocessed as follows: (1) tangencies and common lines are detected and classified; (2) tangencies are resolved using well known algorithms of prior art; (3) common line segments are eliminated using algorithms of the current invention: pieces with common line segments are reshaped so that the largest possible portions of the tool path become strictly coincident while buffer between pieces is eliminated; after that coincident portions of the tool path created at the previous step are replaced by a newly created portion of the tool path, so that each common line path is cut once instead of twice; (4) the new tool path is generated so that the best possible quality and highest possible throughput are achieved. Note that the highest quality requirement usually means that the newly created common line portions of the tool path are cut continuously, as a whole, without lifting and then reinserting the cutting tool, and before all other portions of the tool path.

The ability to automatically resolve generic tangency and common line critical situations results in following advantages:

(a) higher operator productivity because manual solution of these critical problems is very time consuming;

(b) better accuracy of the cut, by removing tool path deviation along the path of "less resistance";

(c ) better quality of the produced pieces because of better accuracy and absence of frying and other damage to the material; and (d) reducing the material waste, since pieces in a marker are intentionally packed more closely than in the prior art practice, with intentionally created critical problems to be resolved by post-processing of the NC data.

SUMMARY OF THE INVENTION

It is a general object of the current invention to provide an automatic method of cutting sheet material from a closely-packed marker containing tangency points and common lines. It is a specific object of the invention to provide such a method that minimizes cutting time.

In accordance with one aspect of the present invention, a method of cutting parts out from sheet by means of a numerically-controlled cutting system having a cutting tool which cuts along a path, includes placing a plurality of templates, each having a plurality of segments, having the shapes and sizes of the parts upon the sheet into a closely-packed marker, minimizing the spaces between the templates, then inputting the marker into a pre-processor. Within the processor are the steps of detecting tangencies and common lines between templates, and then changing the tool path and speed to solve the detected tangency and common line problems.

In accordance with a second aspect of the invention, the common line detection further includes the steps of detecting all proximate pair of segments, and then, for each proximate pair of segments, checking if said pair has an angle between segments smaller than a threshold angle, $\beta_{cr}$, and if so, then clipping each segment of the pair by the belt rectangle of the other segment and calculating the clipped length. Finally, if the clipped length is greater than a maximum allowable "threshold" distance, $D_{cr}$, then the segments are marked as common line segments.

According to a third aspect of the invention, the segments are marked as tangent segments: (1) if the angle between segments is less than the maximum allowable angle, $\alpha_{cr}$, (which may and usually is different from the maximum allowable angle, $\beta_{cr}$, used in the common line detection algorithm); (2) if the segments are not common line segments; and (3) if the clipped length is greater than the maximum allowable "threshold" distance $L_{cr}$ (which may and usually is different from the maximum allowable "threshold" distance, $D_{cr}$, used for detection of common lines).

According to a fourth aspect of the invention, the path and speed of said cutting tool are determined by a numerical control program.

According to fifth aspect of the invention, the changing of the tool path is done by a cutting operator, by printing the marker out to a drawing or by viewing and measuring the marker on the screen, then cutting pieces manually.

According to a sixth aspect of the invention, each common line is cut in one pass.

According to a seventh aspect of the invention, each common line may be cut manually in one pass.

According to a eighth aspect of the invention, each common line may be cut as one tool path segment, that is the cutting tool cuts the common line continuously without any dry haul and without lifting and reinserting the cutting tool.

According to a ninth aspect of the invention, at least one of common lines can be approximated by a straight line.

According to a tenth aspect of the invention, at least one of common lines can be approximated by a curved line.

According to an eleventh aspect of the invention, each curved common line is approximated by a sequence of a straight line segments.

According to a twelfth aspect of the invention, the creation of the closely-packed marker is done by a marker generation software.

According to a thirteenth aspect of the invention, the creation of the closely-packed marker is done by video scanning of a physical model of templates arranged within the area of a sheet of material.

According to a fourteenth aspect of the invention, all the templates are sorted into one or more subsets such that templates in each subset contain common segments with the templates of that subset only, and then each subset is sorted into sub-subsets of common lines segments such that each common line segment belongs to one sub-subset only. Then, for each sub-subset, a common line is created that approximates all the common line segments therein. Finally, the optimal tool path is calculated for each template containing a common line.

According to a fifteenth aspect of the invention, an optimum tool path is selected that minimizes intra-piece dry haul time.

According to a sixteenth aspect of the invention, an optimum tool path is selected which maximizes intra-piece quality by imposing additional constraints, like cutting common lines before the perimeter of the piece.

According to a final aspect of the invention, each common line is generated by a number of different methods, including straight line approximation, polynomial interpolation, least squares fitting, B-Spline interpolation, cubic spline interpolation, and a user-selected non-linear curve.

DESCRIPTION OF DRAWINGS

These, and further features of the invention, may be better understood with reference to the accompanying specification and drawings depicting the preferred embodiment, in which.

DESCRIPTION OF THE PREFERRED EMBODIMENT

Figure 1:
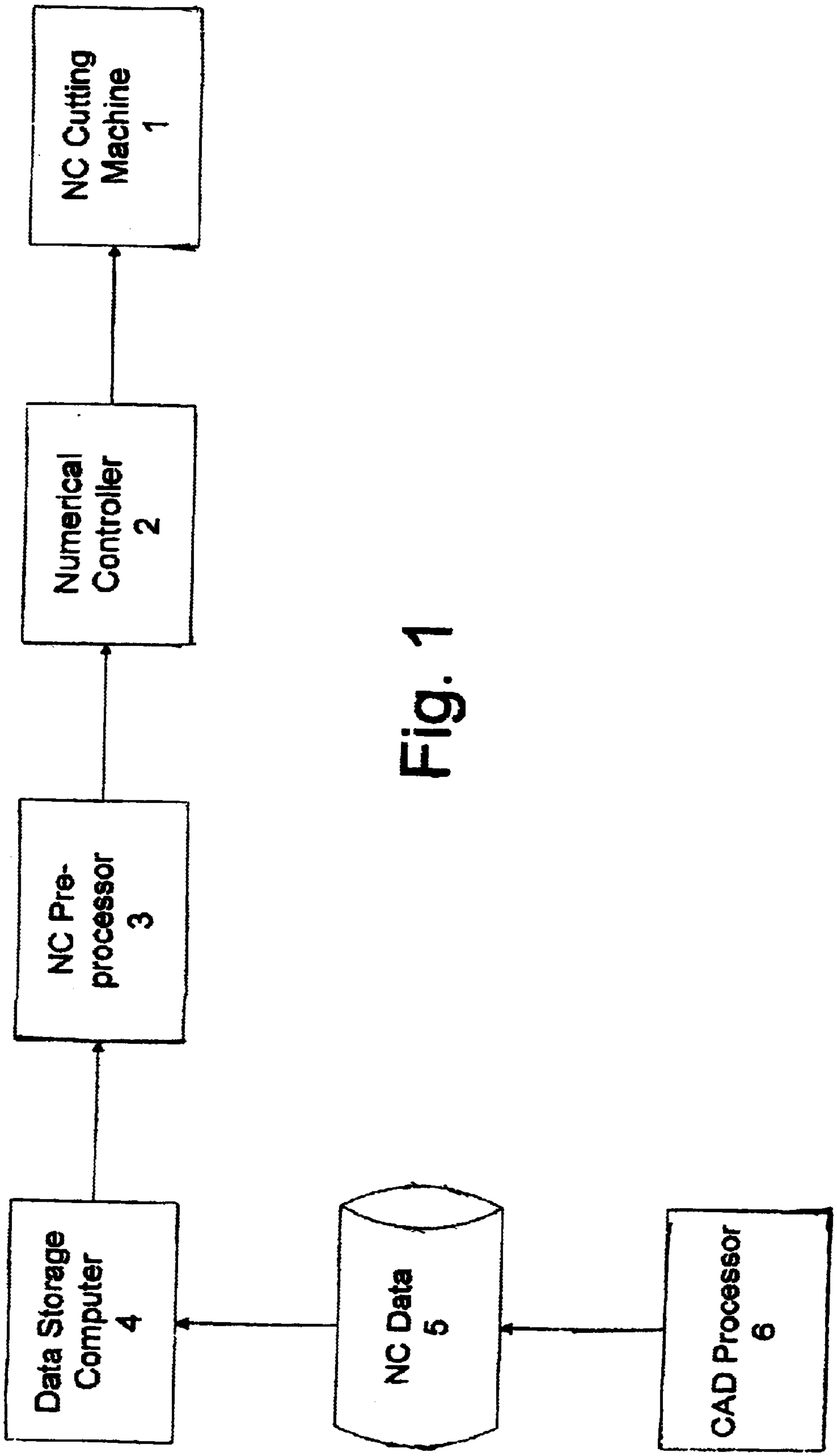
FIG. 1 depicts a block diagram showing the components of the cutting system in the preferred embodiment of the current invention.

In the preferred embodiment of the present invention presented at FIG. 1, a numerically controlled cutting machine 1 is used to cut a multi-ply layup of sheet material including woven and non-woven fabrics, paper, cardboard, leather, rubber and synthetic materials, among others. The machine 1 is numerically controlled, and for that purpose is connected to a numerical controller 2—a microprocessor that may physically reside within the cutting machine or within a separate computer externally connected to the cutter. The numerical controller communicates with the numeric control (NC) data pre-processor—another computer 3. The cutting machine, the numerical controller, the NC data pre-processing computer and their interaction are fully disclosed in U.S. Pat. Nos. 3,855,887 and 3,864,997 to Gerber at el. and therefore will not be repeated here.

Figure 2:
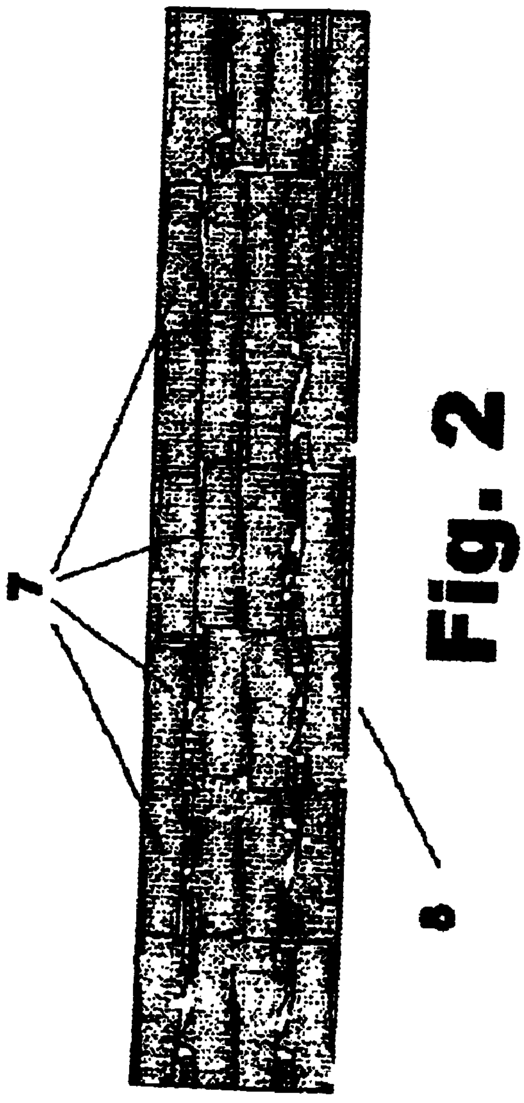
FIG. 2 depicts a marker of pattern pieces showing typical positional relationships of various pieces, represented by templates, as they are cut from sheet material.

In the preferred embodiment of this invention the NC data pre-processor receives raw NC data from yet another computer 4, which stores the data 5 generated beforehand by a CAD program in CAD processor 6 and transfers the processed NC data to the numerical controller 3. The CAD processor generates a computer representation of the marker, shown in FIG. 2, and stores this information in the NC database 3.

The automatic pre-processing of raw NC data in the current invention consists of two phases: (1) detection and classification of possible problems in the location of the templates within the marker which require changes in the tool paths and/or cutting speeds; and (2) solution of the detected problems by changing the NC data that controls tool paths and cutting speeds as required. The detection and classification is performed in the current invention within the NC pre-processor 3. The solution is also performed within the NC pre-processor 3 by automatically altering the NC data driving the numerical controller 2 so that the cutting tool cuts along the altered path in the vicinity of such critical cuts and/or is slowed down when critical cuts are to be made.

Figure 5:
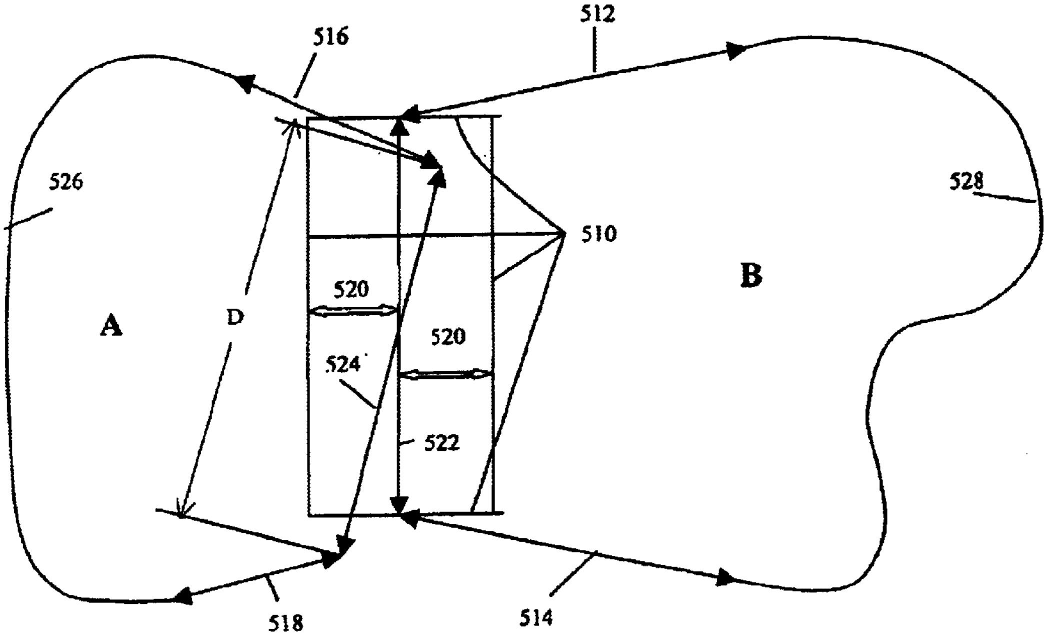
FIG. 5 depicts a belt rectangle at the intersection of two templates, showing how the angle between critical lines and the length of the lines within the critical region are defined in the preferred embodiment of the current invention
Figure 6:
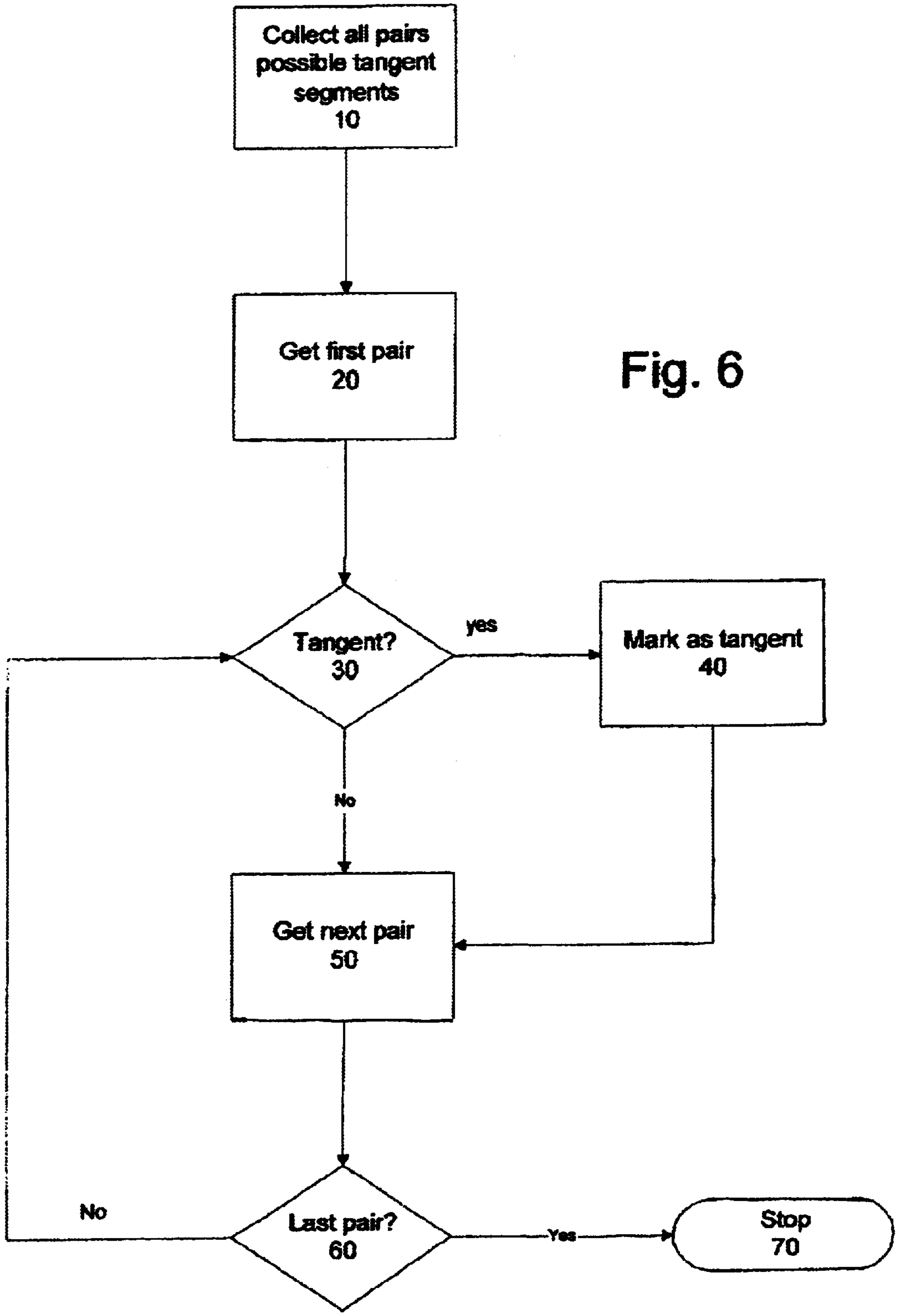
FIG. 6 depicts a block-diagram of the "generic tangency detection" algorithm.

The detection algorithm uses the notion of the "belt rectangle", which is defined as a rectangle with a pair of sides parallel and equal to the given straight line segment and located on opposite sides of the given segment. Referring now to FIG. 5, two templates A and B are shown, representing two pieces of materials. These templates may be considered to be made up of a number of interconnected straight line segments. The left-hand piece, A, contains segments 516, 526, 518, and 524, while the right-hand piece B contains the segments 512, 528, 514, and 522. The belt rectangle in FIG. 5 contains the sides 510. The height of the rectangle is equal to segment 522, while the width 520 is a constant chosen by trial and error for this algorithm. The line segment 522 is midway between the long sides of the belt rectangle.

Figure 10:
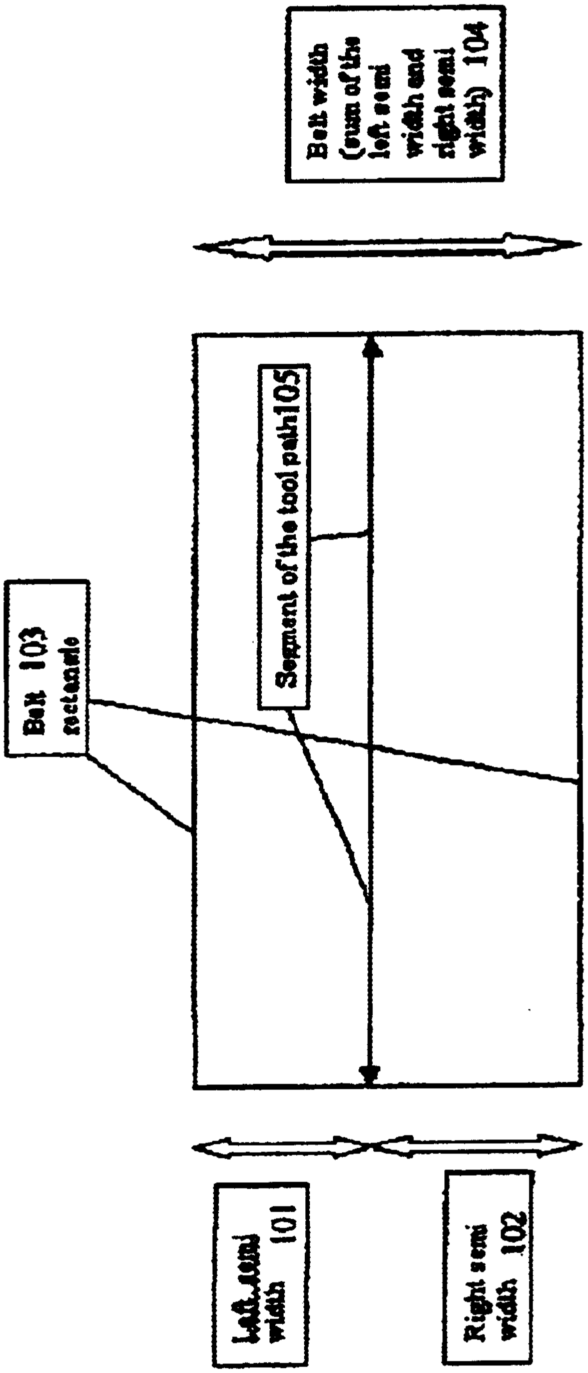
FIG. 10 depicts a belt rectangle, showing its various components.

Referring now to FIG. 10 the belt rectangle 103 has a long side 105, which becomes the path of the cutting tool. The width of the belt rectangle has a left semi-width 101, and a right semi-width 102 which, when added, equal the belt width 104. In the simplest form, the belt rectangle is generated with the left and right semi-widths equal.

Referring again to FIG. 5, it is seen that segment 524, belonging to template A, falls within this belt rectangle for the most part, with a small portion of segment 524 outside of the belt rectangle. When the smallest angle β_between segment 522 and 524 is small enough (less then some user-defined threshold angle, as discussed below), and at least part of the segment 524 is contained within the belt rectangle, and this part is large enough (more than some user-defined threshold value, as discussed below) then segments 522 and 524 will be considered to be common line segments or tangent segments. Under such circumstances, these common line segments must be treated by changing the path of the cutting tool, while tangent segments must be treated by modifying the subsequent cutting of the material, either by slowing down the speed of the cutting tool, or by changing the direction of the cut, or both, or by changing the path of the cutting tool. The latter techniques for treating tangencies are all well known in the prior art, and will not be discussed further herein.

In the case that either of the segments 522 and 524 of the above example are quite small, in the order of tenths of an inch, the geometry is one containing tangent points, rather than common lines. Whichever of these critical situations is detected, the use of the belt rectangle allows common lines to be treated the same, whether they are external, internal, or mixtures of each. The same is true of tangent points, and points of close approach, in that the detection process treats these various cases of tangencies in the same way.

The "belt width" W characterizes the so-called "critical distance", that is a lower bound of distances at which two given tool path segments can be cut without problems. It should be evident that "belt width" value depends on the material and cutting tool at hand. A typical value of the "belt width" for cutting a multi-ply layup of limp sheet material is about tenths of an inch. The ratio, $\rho = W_{left}/W$, characterizes the relative importance of "critical problems" to the left of the given segment, for example, inside or outside the given piece. If ρ is zero, then, by convention, critical situations inside the piece can be neglected (problems inside the piece are not important); if ρ approaches one, then critical situations outside the piece can be omitted (problems outside the piece are not important). For simplicity, in further discussion we assume that this ratio equals one, and the given segment is the median of the "belt rectangle" (FIG. 5), so that critical situations both inside and outside the piece are equally important. Given the notion of the "belt rectangle", we can define "generic" "tangent segments" and "common line segments". A pair of straight line segments makes generic common line segments" if the absolute value of the smallest angle, β, between segments is less than some predefined critical value, $\beta_{cr\_}$ and the length, D, of the portion of the given segment inside the "belt rectangle" of the other segment is greater that some predefined value, $D_{cr}$.

Though evidently problem dependent, typical values of the common line critical parameters, $\beta_{cr}$ and $D_{cr}$., are about 1° and 2.5" correspondingly. A pair of straight line segments makes "tangent segments" if they are not "common line segments" and the absolute value of the smallest angle, $\alpha$, between segments is less than some predefined critical value, $\alpha_{cr}$ and the length, L, of the portion of the segment inside the belt rectangle of the other segment, is greater that some predefined value, $L_{cr}$. Though evidently marker dependent, typical values of the tangent critical parameters, $\alpha_{cr}$ and $L_{cr}$., are about 10° and 0.25" correspondingly. For brevity, we will refer to both "tangent line segments" and "common line segments" as "critical segments".

Given the definition of the critical segments, the common line detection algorithm can be described as follows:

1. Iterate through pairs of segments that are suspicious for being "common line segments".
2. At each step of iteration check if the given pair makes "common tine segments": if the absolute value of the smallest angle between segments is smaller than the maximum allowable angle, $\beta_{cr}$., then clip each segment of the pair by the "belt rectangle" of the other segment and calculate the. clipped length; if it is greater than the maximum allowable distance, $D_{cr}$ then mark the segments as "common line segments". Clipping algorithms are well known in the art and described in a number of textbooks for undergraduate and graduate students. For a description of the Cohen-Sutherland line-clipping algorithm and its implementation in "C" see L. Ammeraal, "Programming principles in computer graphics", John Wiley and Sons, 1992, which is incorporated herein by reference. For a description of the parametric line clipping algorithm by Cyrus and Beck and its implementation in "C" see "Computer Graphics Principles and practice, Second edition in C. Eds.: James D. Foley, Andries van Dam, Steven K. Feiner, and John F. Hughes. Addison-Wesley, 1996, which is incorporated herein by reference.

The tangency detection algorithm works similar to the common line detection, except that it checks for common line conditions before checking for tangency and excludes common lines segments from the set of tangent segments.

Figure 3A:
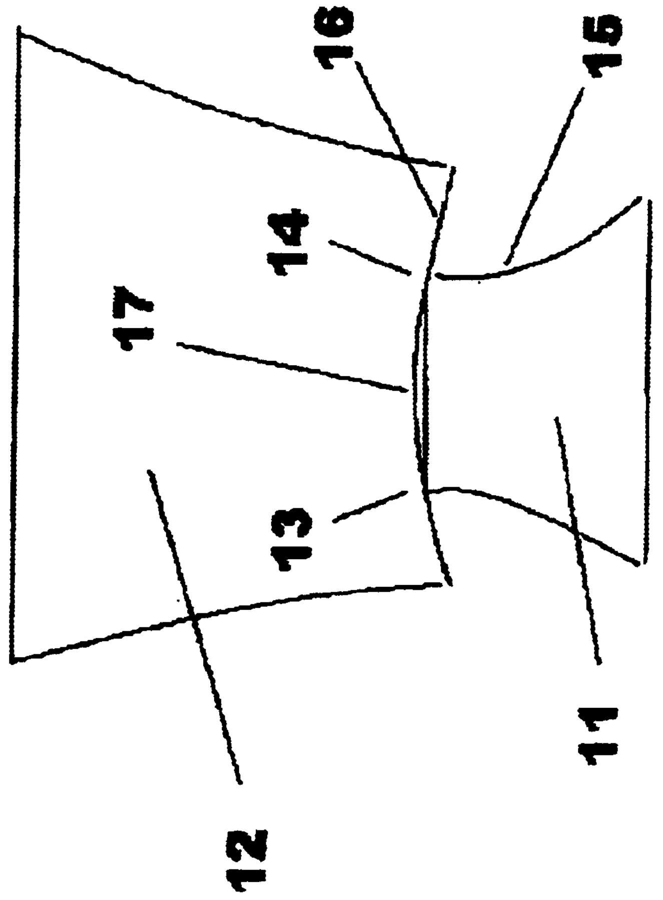
FIG. 3*a* depicts a pair of pieces with one-sided tangent points.
Figure 3B:
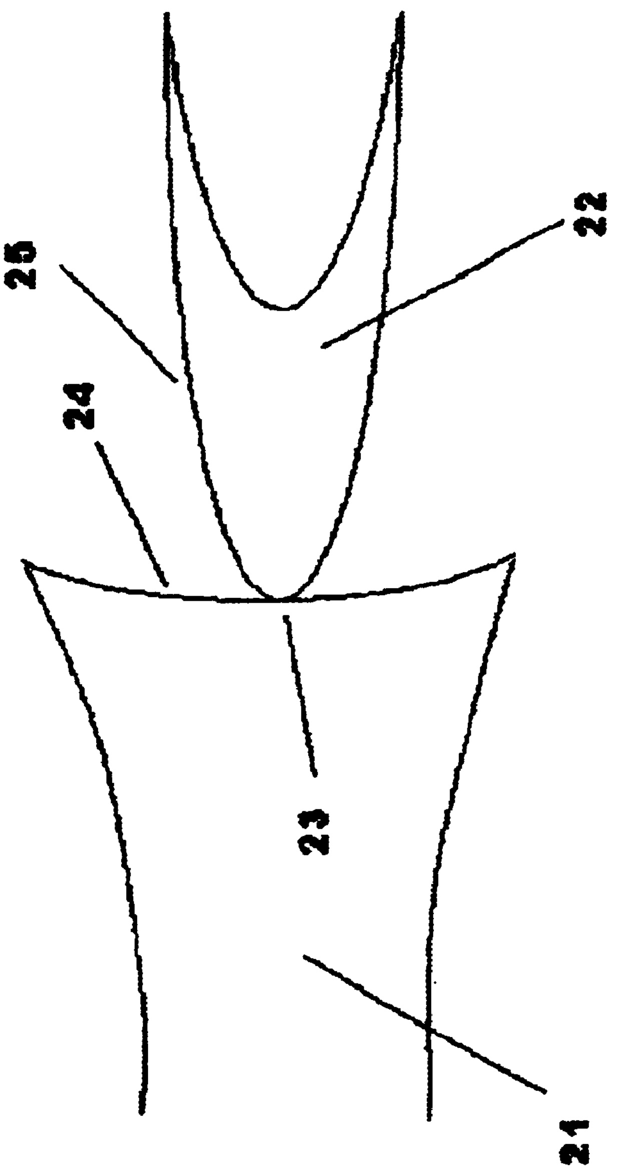
FIG. 3*b* depicts a pair of pieces with a tangent point.

Detected generic tangent points are classified as one-sided (FIG. 3A), or two-sided (FIG. 3B). Referring first to FIG. 3*a*, two templates, 11, 12 are disposed in proximity to each other, with two tangent points 13, 14. The points of tangency 14 results from the proximity of line 16 which forms the lower boundary of template 12, and line 17 which forms the upper-boundary of template 11. Tangent point 14 is one sided, because the angle between line 15 and line 16 (which is the right-hand boundary of template 11) exceeds the critical value, while angle between lines 17 and the line 16 is less than the critical value.

Referring to FIG. 3*b*, the two templates, 21, 22, have a tangent point 23, which results from the proximity of line 24 of template 21, and line 25 of template 22. Unlike the case of FIG. 3*a*, the lines of both templates are more-or-less parallel in the vicinity of the tangent point.

Figure 3C:
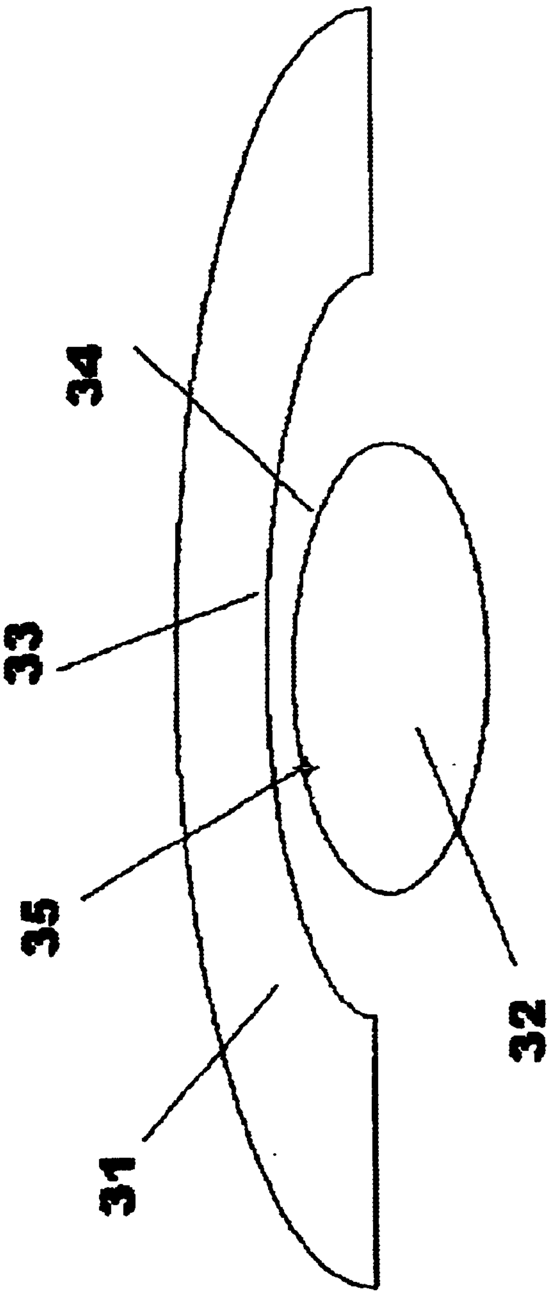
FIG. 3*c* depicts a pair of pieces with a two-sided tangent point of close approach.
Figure 4A:
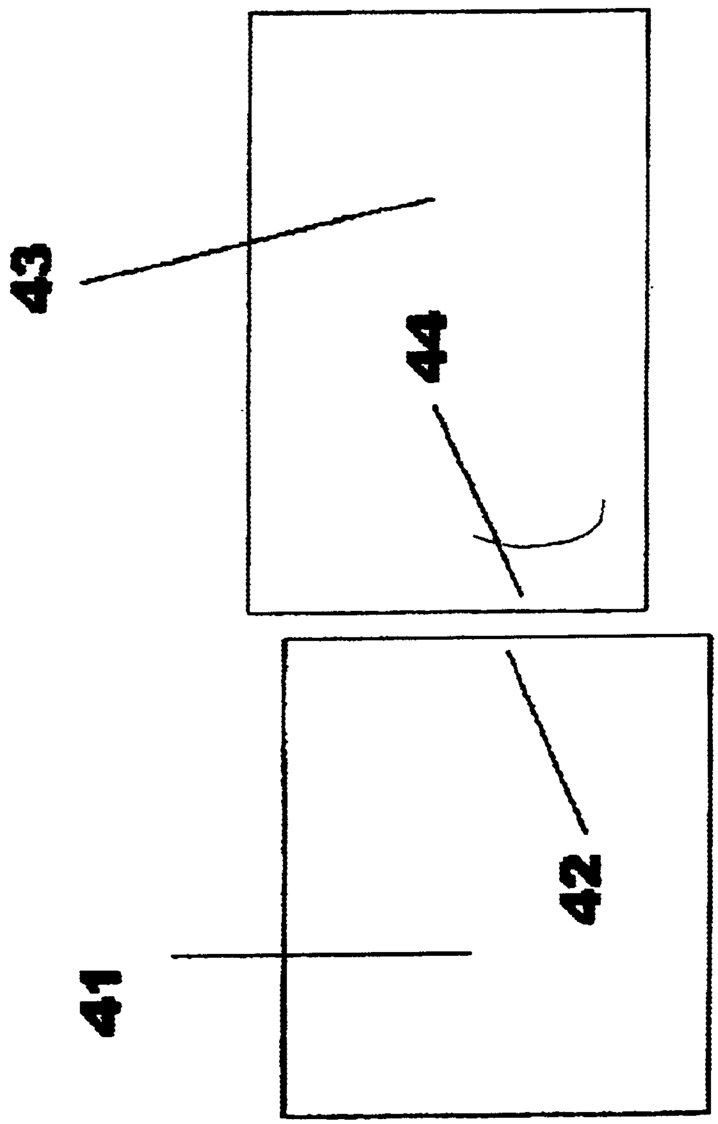
FIG. 4*a* depicts a pair of pieces with a "generic" common line segments.
Figure 4B:
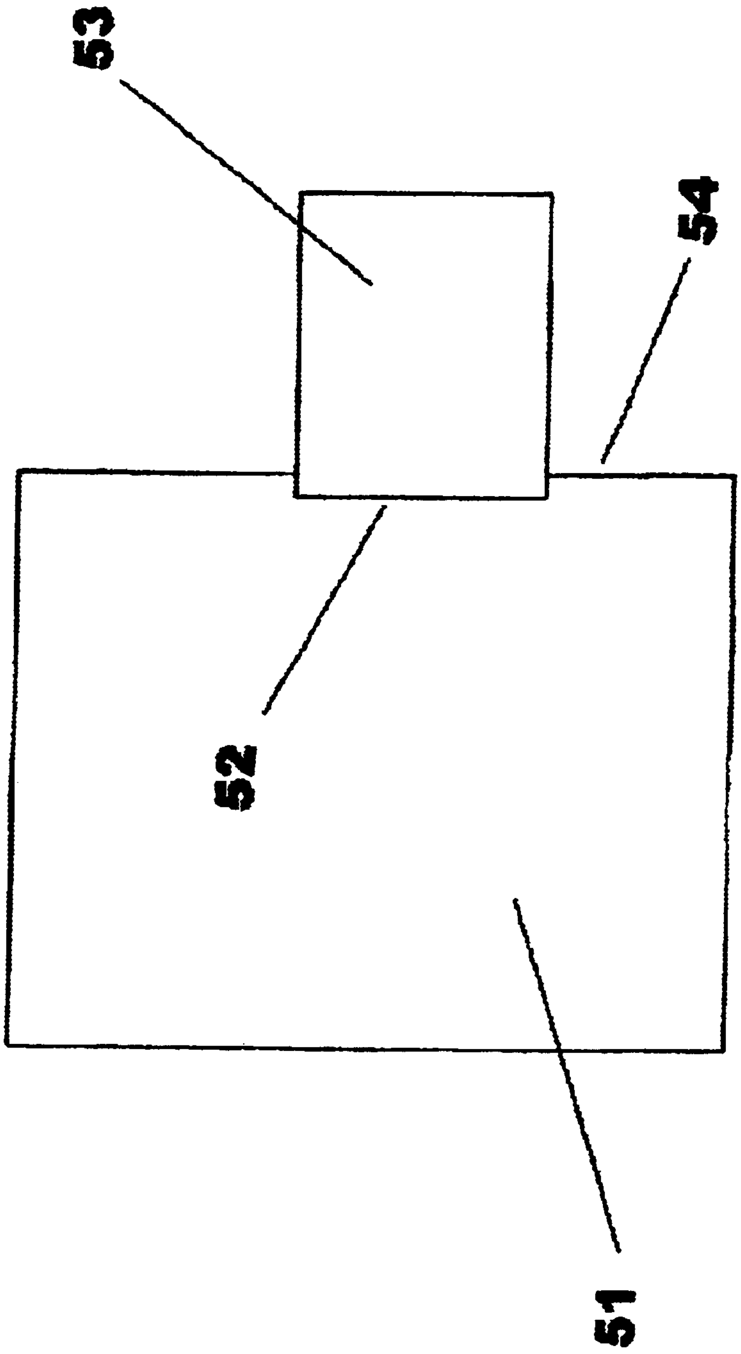
FIG. 4*b* depicts a pair of pieces with an intersecting common line segments between several pieces.
Figure 4C:
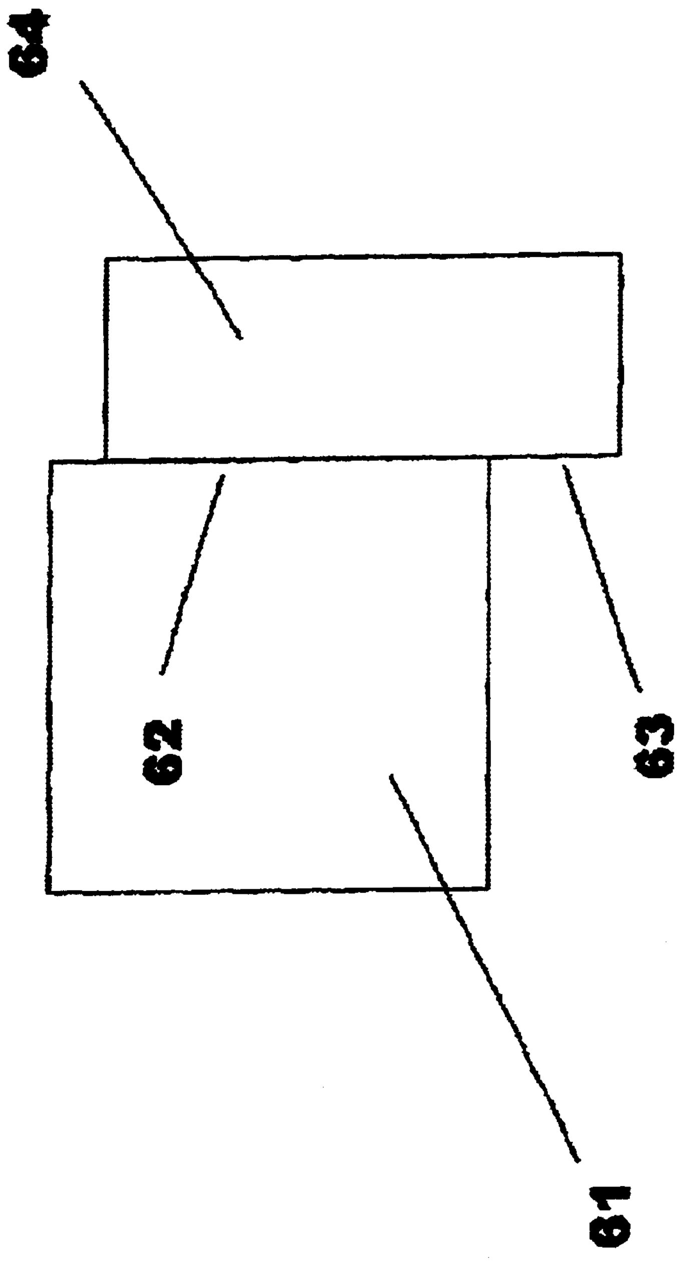
FIG. 4*c* depicts a pair of pieces with a nearly coincident common line segments between the pieces.
Figure 4D:
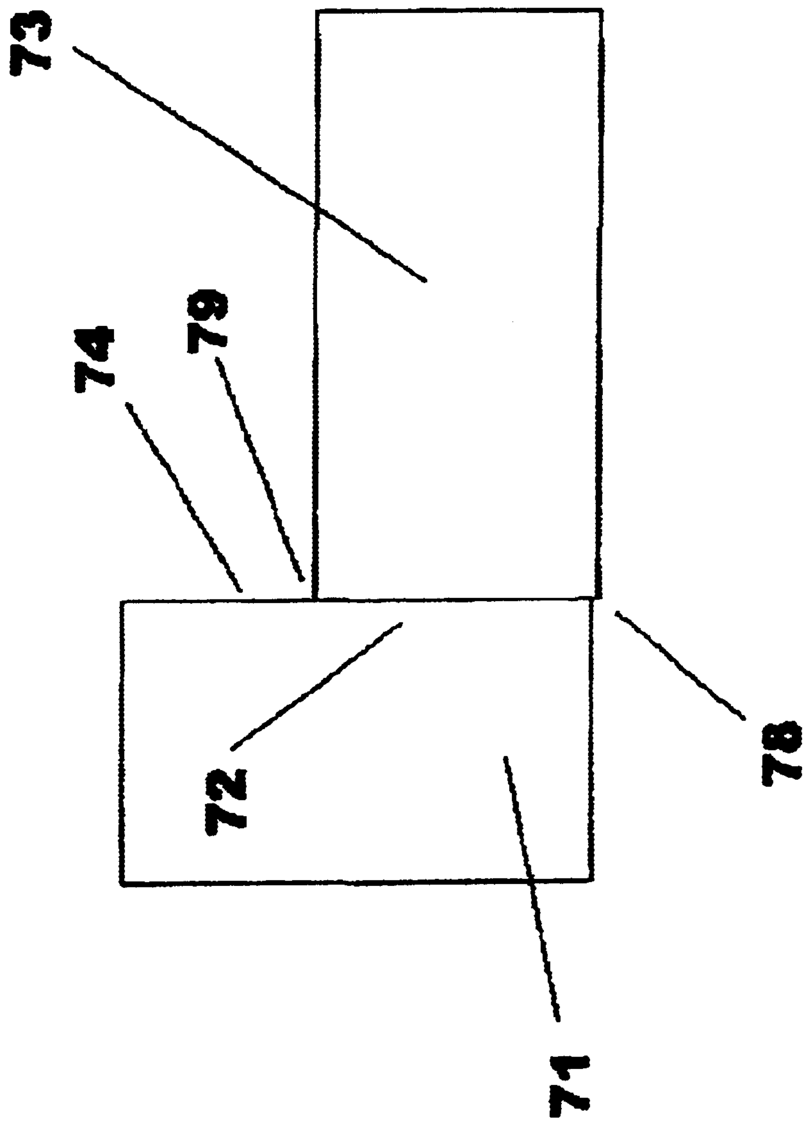
FIG. 4*d* depicts a pair of pieces with a strictly coincident common line segments between the pieces.

Referring now to FIG. 3*c*, templates 31, 32 do not actually touch, but come close to touching at point 35, which is called a "point of close approach." This is a two-sided point of close approach, since lines 33 of template 31, and line 34 of template 32, are more-or-less parallel in the vicinity of the point of close approach. Practically, the point of close approach is treated in the same way as a point of tangency.

Detected and classified tangent problems are resolved using algorithms that are fully disclosed in U.S. Pat. No. 3,864,997 to Pearl and Robison and in U.S. Pat. No. 4,327,615 to Heinz Gerber, and therefore need only few comments here. In general, the tangency resolution algorithm tries either to change the direction of the cut by moving the cutting tool towards the tangent point instead of away from it. Special attention is paid to one-sided tangencies, which sometimes can be resolved just by reversing the cut of a piece as whole, from clockwise to counterclockwise direction, for example, or vice versa, or by swapping the cutting sequence of two "problem" pieces. If this technique suggested by Pearl and Robison cannot be used (for example, if a two-sided tangent point requires a smooth high quality cut which can be achieved by continuous cutting only, or two pieces has two different one-sided tangent points, so that swapping of the pieces in the cutting sequence does not help), then the mode of the cutting tool operation is changed as proposed by Gerber (see prior art discussion).

Detected common line segments are classified as either external or internal or mixed (strictly coincident or not) for statistical purposes used in the reports (marker with many internal common lines are considered "bad" markers, and may require special attention). Detected and classified common line problems are resolved using the "common line resolution" algorithm, which can be understood by first referring to FIG. 7*a*.

Figure 9A:
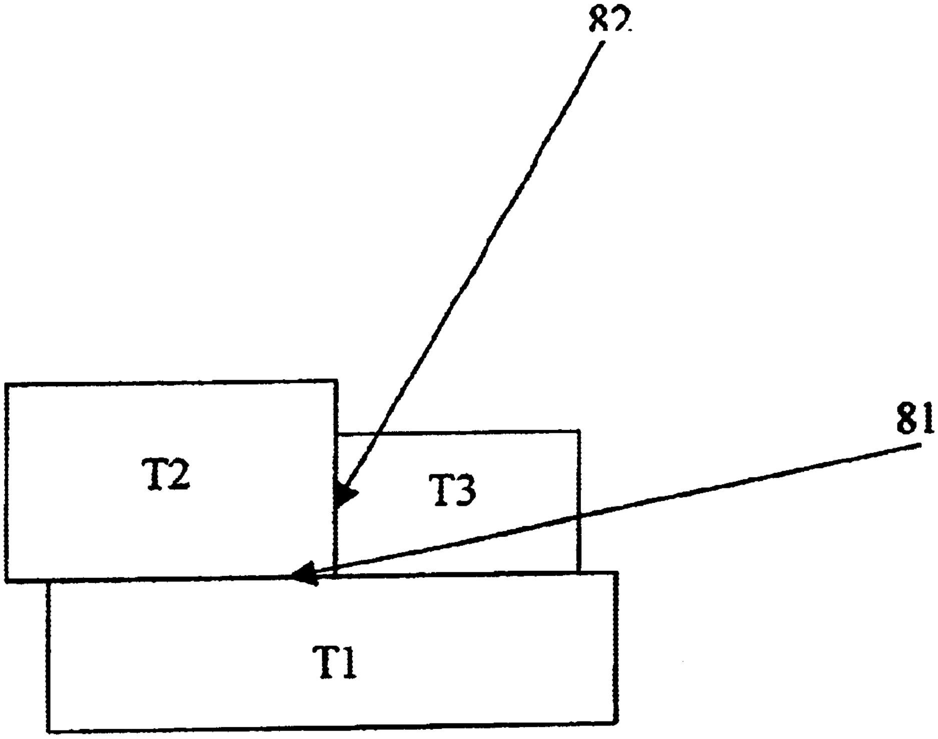
FIG. 9*a* depicts three templates having two common lines among them.

(1) First, in accordance with block 110, if any common line exists, all the templates of the marker are partitioned into subsets such that templates in any given subset contain common segments with the pieces of that subset only. Starting with the first subset 120, the common line problems within this subset are resolved. The next subset is fetched 140, and the process repeated at block 130, and the process repeated for each subset until a test 150 detects the last subset, at which time the process stops 160. As an example of this partitioning, and referring now to FIG. 9*a*, templates T1 and T2 share common line 81, while templates T2 and T3 share common line 82. The segments that make up templates T1, T2, and T3, together with the segments making up the common lines 81 and 82 will belong to a single subset, $S_n$.

Figure 7A:
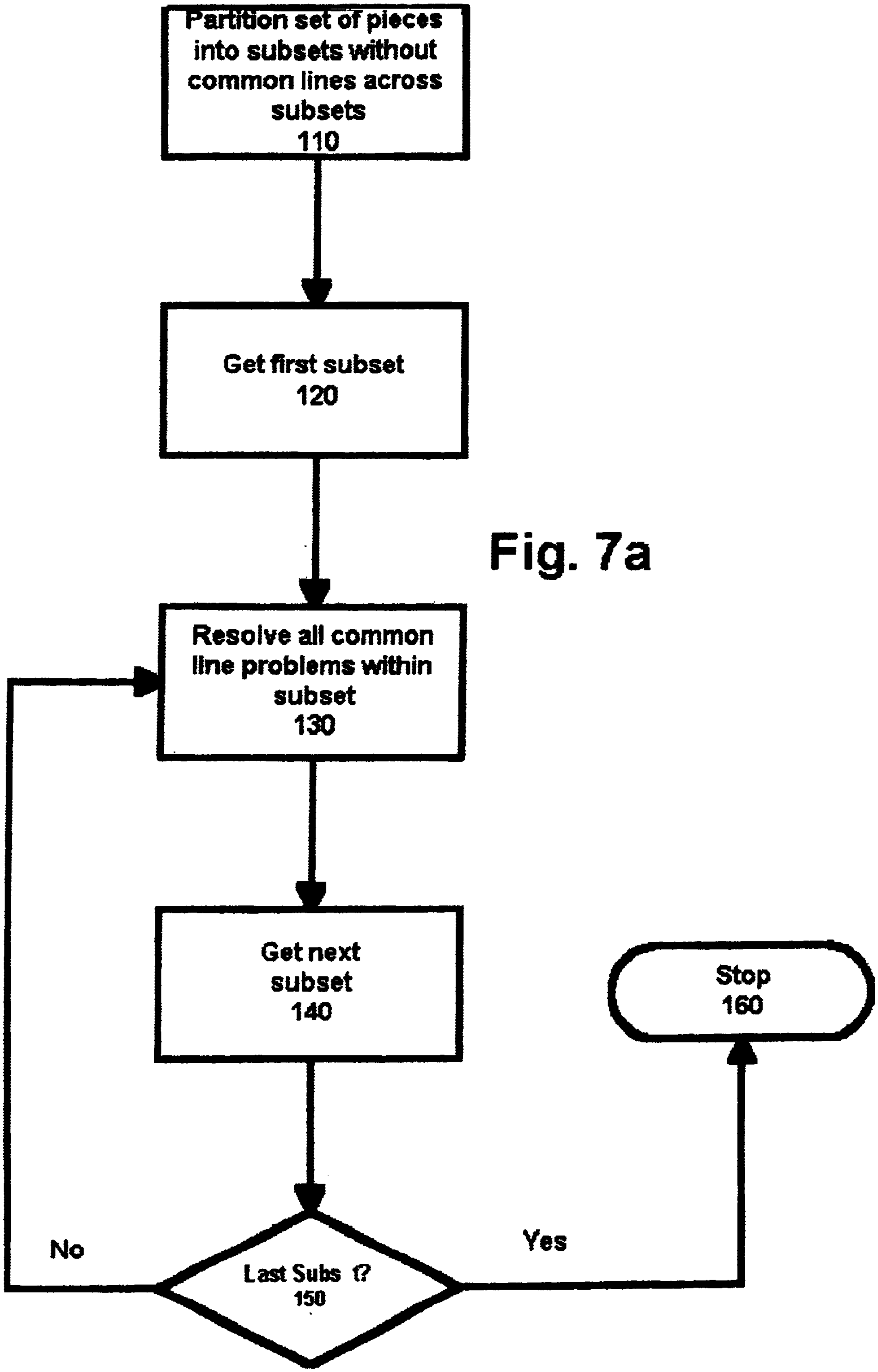
FIG. 7*a* depicts a block-diagram of the "common line resolution" algorithm.
Figure 7B:
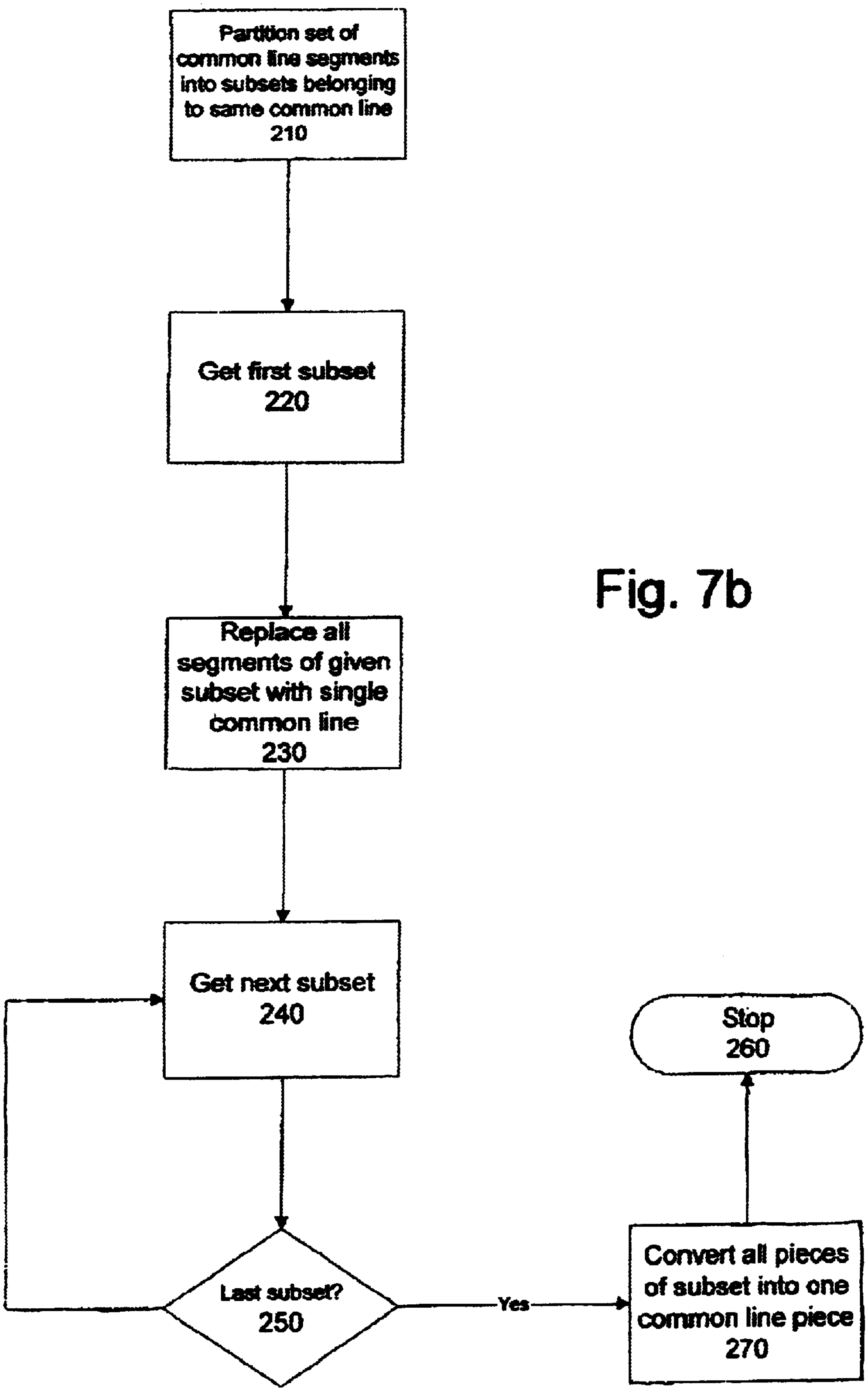
FIG. 7*b* depicts a block-diagram of the optimization step of the common line resolution algorithm.
Figure 9B:
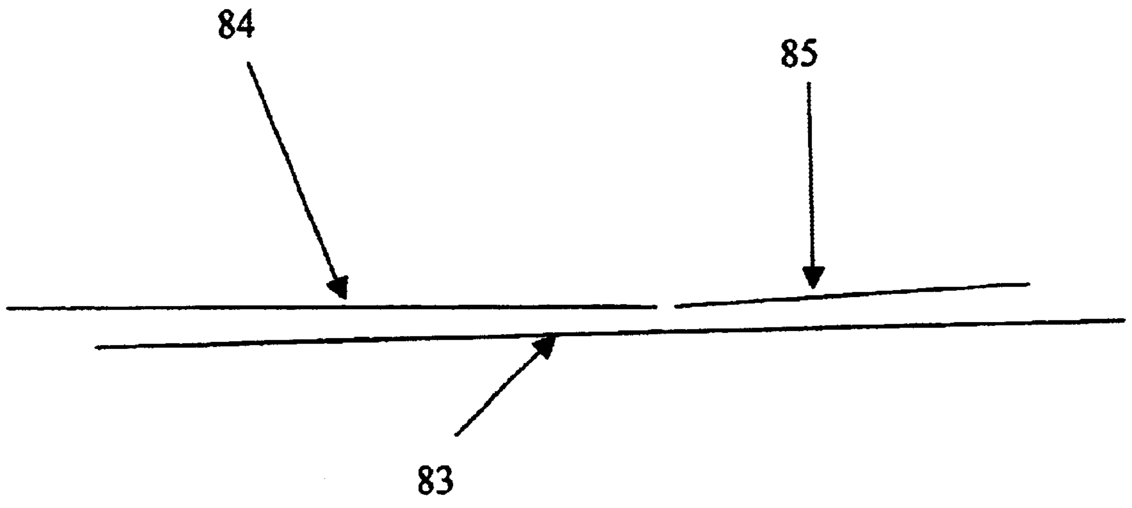
FIG. 9*b* depicts one of the common lines of FIG. 9*a*, showing the three segments that make up the common line.
Figure 9C:
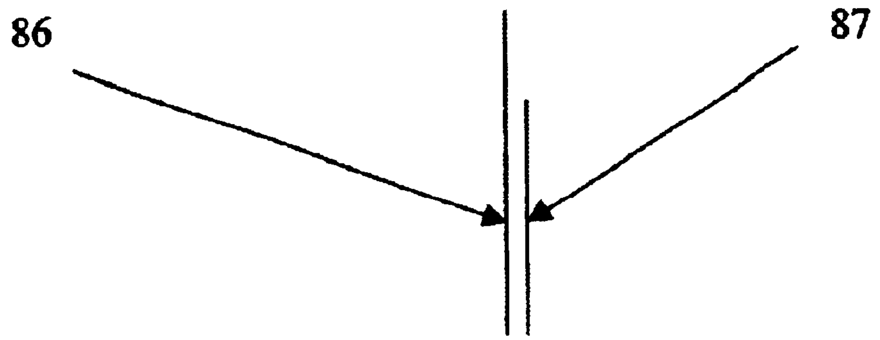
FIG. 9*c* depicts the other of the common lines of FIG. 9*a*, showing the two segments that make up the common line.

(2) Still referring to FIG. 7*a*, each subset of pieces defined above is partitioned 210 into sub-subsets of common lines segments such that each common line segment belongs to one sub-subset only. As an example of this subset partitioning, refer now to FIG. 9*b*, which depicts a close-up view of the common lines 81, showing that it is made up of segments 83, 84, and 85, which form a sub-subset $SS_{n1}$ of the Set $S_n$. FIG. 9*c* depicts a close-up view of common line 82, which is made up of segments 86 and 87, which make up sub-set $SS_{n2}$ of the Set $S_n$.

Figure 7C:
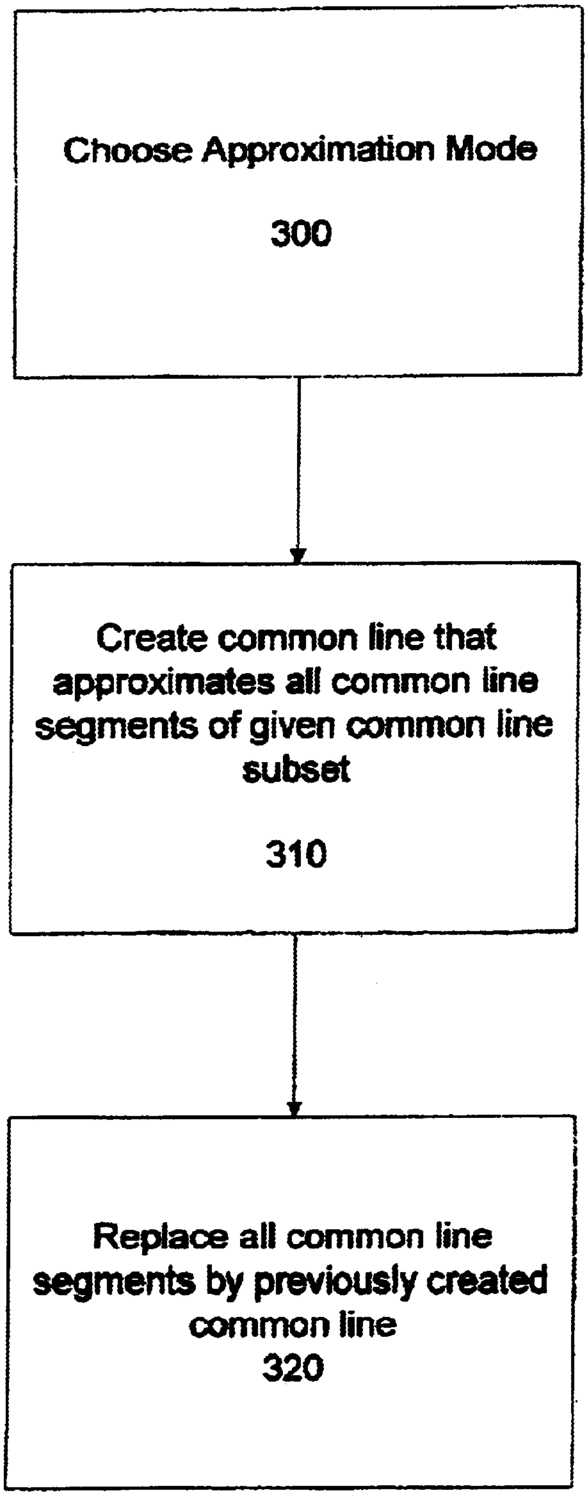
FIG. 7*c* depicts a block-diagram of the "common line generation" step of the common line resolution algorithm that replaces "common line subset" of segments with a common line.
Figure 9D:
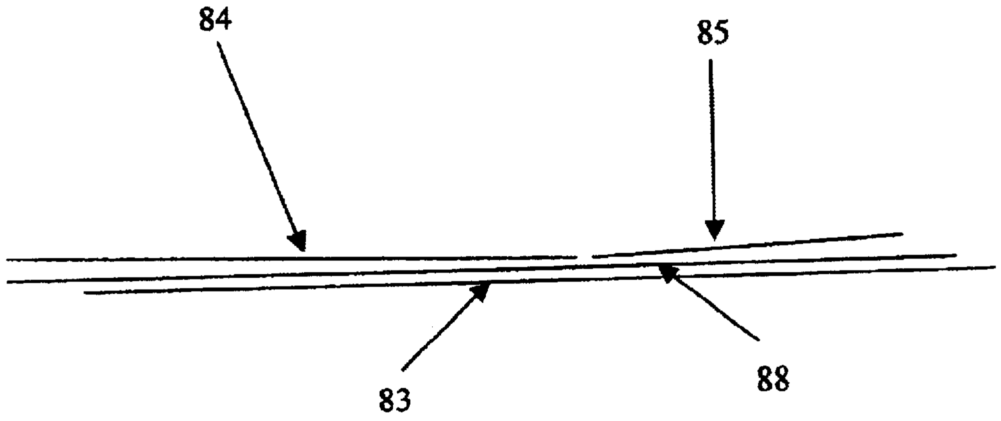
FIG. 9*d* depicts a straight line approximation of the common line of FIG. 9*c*.

3. Next, the desirable mode of the common line approximation is selected 300, as shown in FIG. 7*c*, where the common line approximation mode being defined as a combination of the approximation type and order:

3.1. Select an approximation order, with first order corresponding to a straight-line approximation. As an example, and referring to FIG. 9*d*, the first order approximation of the common line made up of segments 83, 84, and 85 is straight line 88;

3.2. Approximation types are selected from the following available choices: Polynomial interpolation, Rational Function interpolation, Cubic Spline interpolation, B-Spline interpolation, or Least Squares Fitting.[12]

[1] Each approximation algorithm and the corresponding implementation exist in many versions that are described in numerous textbooks on interpolation techniques for undergraduate and graduate students (for example, M. Mortenson, "Geometric Modeling", John Wiley & Sons, 1985, pp.30–147; T. H. Cormen, C. E. Leiserson, R. L. Rivest, "Introduction to algorithms", MIT press, Cambridge, 1999, pp.766–75;)

[2] The optimal choice of the common line approximation mode is problem and cutter dependent and therefore is user-defined. For those cutters that do not support curved path segments the simplest choice is to use a linear approximation, to avoid subsequent linear interpolation of a higher order approximation 4. Create a common line that approximates all common line segments of a given "common line subset" using the approximation mode selected in step 3 (FIG. 7C)

5. Replace all common line segments of a given "common line subset" with a single common line created in step 4 (FIG. 7C).

Figure 7D:
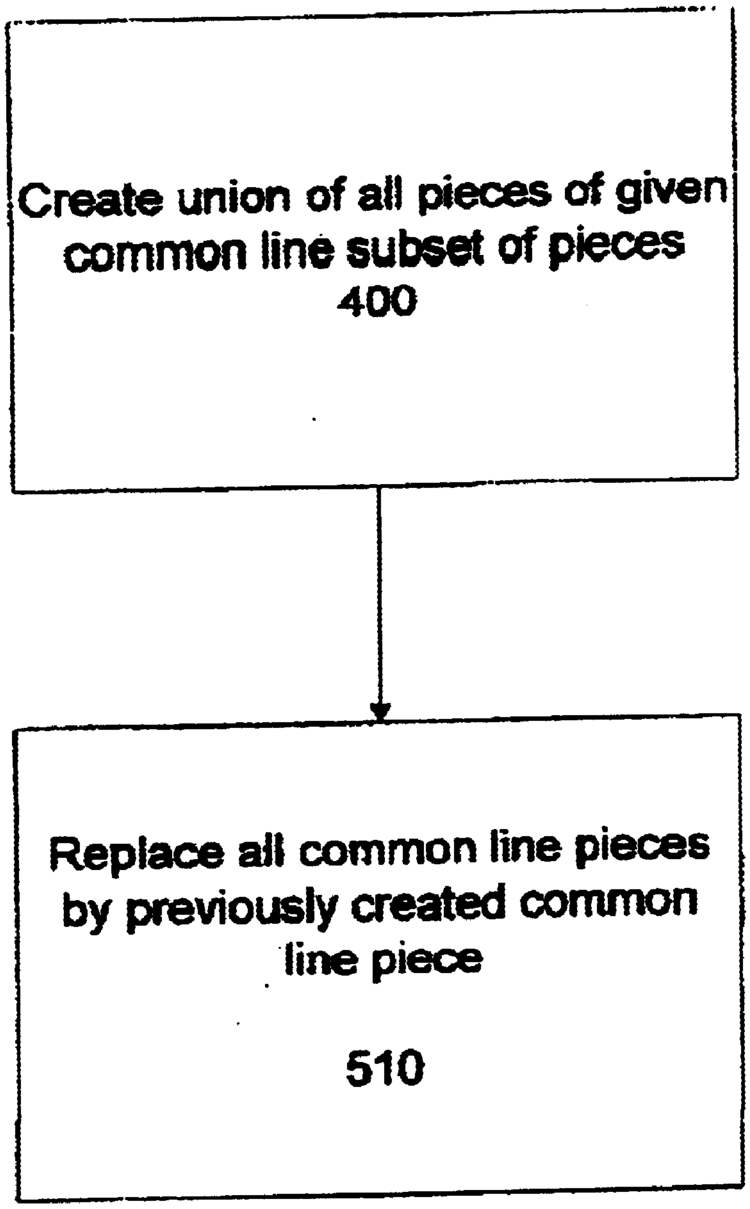
FIG. 7*d* depicts a block-diagram of the "common line piece generation" step of the common line resolution algorithm that replaces "common line subset" of pieces with a single ("common line") piece.

6. Unite all pieces of each subset, defined in step 1 of this algorithm, into one piece, called a "common line piece" (FIG. 7D). Algorithms for calculating union and intersection of polygons are well known in the art. See, for example, M. Mortenson, "Geometric Modeling", John Wiley & Sons, 1985, which is incorporated herein by reference; K. Weiler, "SIGGRAPH 80, V. 14, No 3, pp. 10–18, 1981; Milenkovic, "Robust Polygon Modeling", Computer-Aided Design, 1993, v. 25, no 9, pp. 546–566, also incorporated herein by reference.

7. Calculate the optimal tool path for each newly created "common line piece", taking into account all relevant optimization constraints (FIG. 7D).

The tool path optimization algorithm for a "common line piece" (optimization step 7 of the above-given "common line resolution algorithm") is as follows. A "common line piece" has an optimal tool path if the intra-piece dry haul time (i.e. the time for the non-cutting portion of the tool path when the cutting tool is extracted from the material and moves in the air) is minimized under the given constraints. Thus the objective function, Eo, of the said minimization problem is:

$$Eo = S/V,\ S = \sum_i L_{i,i+1}, \tag{1}$$

where $$L_{i,i+1}=\sqrt{[(X_{i+1}-X_i)^2+(Y_{i+1}-Y_i)^2]} \tag{2}$$

is the dry haul distance between the starting point ($X_{i+1}$, $Y_{i+1}$) of the (i+1)-th tool path segment and the last point ($X_i$, $Y_i$) of the previous i-th tool path segment, and V is the dry haul speed (i.e. the speed of the cutting tool in the air).

Optimization constraints might be different for different markers. One example of an optimization requirement is to cut all internal portions of the tool path, newly created common lines in particular, first, before the perimeter of a piece. Another requirement, for example, is to cut segments in tiers, i.e. on column-by-column basis. Note that the number of the optimization requirements and their contents might be different for different markers, so the above mentioned examples do not exhaust the list of possibilities in any way.

All extra optimization requirements can be easily formulated as nonlinear constraints, and any of the constraint-handling techniques can be applied to take them into account. Constraint-handling methods are well known in the art. See, for example, Optimization in Operations Research. Ronald L. Rardin, Prentice Hall, 1998, incorporated herein by reference. According to one preferred embodiment, constraints are taken into account by generating a trial solution without considering the constraints and then to penalize it by adding a penalty contribution to the objective function, E, defined by equations (1)–(2). Of course, it is usually beneficial to use penalty contributions that increase with the degree of the violation of a constraint, though constant penalties are often acceptable as well. For example, a requirement to cut all internal portions of the tool path, newly created common lines in particular, before the perimeter of a piece, can be expressed by adding a value (penalty), E1, to the objective function proportional to the length of the internal portion of the tool path that is cut after the perimeter:

$$E = Eo + E1,\ E1 = \sum_i P_j, \tag{3}$$

where index j enumerates all internal straight line segments that are cut after the perimeter, and $$P_j=P*L_j, \tag{4}$$

where $L_j$ is the length of the j-th tool path segment, defined similar to equation (2), and P is the constant coefficient. Magnitude of the coefficient, P, defines the importance of the given constraint and is marker-dependent: the value P<<1/V (in particular, P=0) means that the given requirement is not important in comparison with the dry haul minimization, while the value P>>1/V means the opposite; typical values are about tents of 1/V.

Another way to deal with constraints is to exclude non-feasible (i.e. violating constraints) configuration from consideration as soon it has been generated, in other words, to impose maximum (death) penalty. For example, a requirement to cut all internal portions of the tool path, newly created common lines in particular, before the perimeter of a piece, can be taken into account by throwing away any trial configuration that has any internal segment cut after the perimeter. Still another way to handle constraints is to correct any infeasible solution by the domain-specific "repair" algorithm. For example, it is possible to directly re-sequence the segments in order to satisfy the above-discussed constraint after calculating solution of the optimization problem without that constraint.

The piece tool path optimization problem belongs to the class of combinatorial optimization problems with constraints. Though NP-hard and computationally very intensive, this particular optimization problem can be solved with a number of combinatorial optimization techniques described in the textbooks for undergraduate and graduate students and in scientific journals (see, for example, T. H. Cormen, C. E. Leiserson, R. L. Rivest, "Introduction to algorithms", MIT press, Cambridge, 1999; C. H. Papadimitriou, K. Steiglitz, "Combinatorial optimization", Dive Publications, Inc., Mineola, N.Y., 1998; M. Pirlot, "General Local Search Methods", in: European journal of Operational Research, 92, 1996, pp. 493–511). This is possible because the total number of segments in a "common line piece" is moderate, often less than 1000 (compare it with a VLSI chip layout problem, where the number of components can be as large as 1,000,000). The present invention contributes nothing to the said optimization techniques; therefore, it is not necessary to review them in this application.

Additional Embodiments

In the preferred embodiment of the present invention, the NC data processing CAM software generates NC data to be used by an automatic cutter to cut various limp sheet materials. Those of ordinary skill in the art will recognize that the technique of eliminating common line segments by replacing it with one common line to be cut once, disclosed in the present invention, is quite general and can be used in many cases. For example, it can be used to cut leather (even manually), to cut sheet metal (if the cutting precision is less than the changes in the size of the pieces induced by replacing common line segments with one common line), to cut paper, etc.

Preferred Mode of Operation of Invention

Figure 8A:
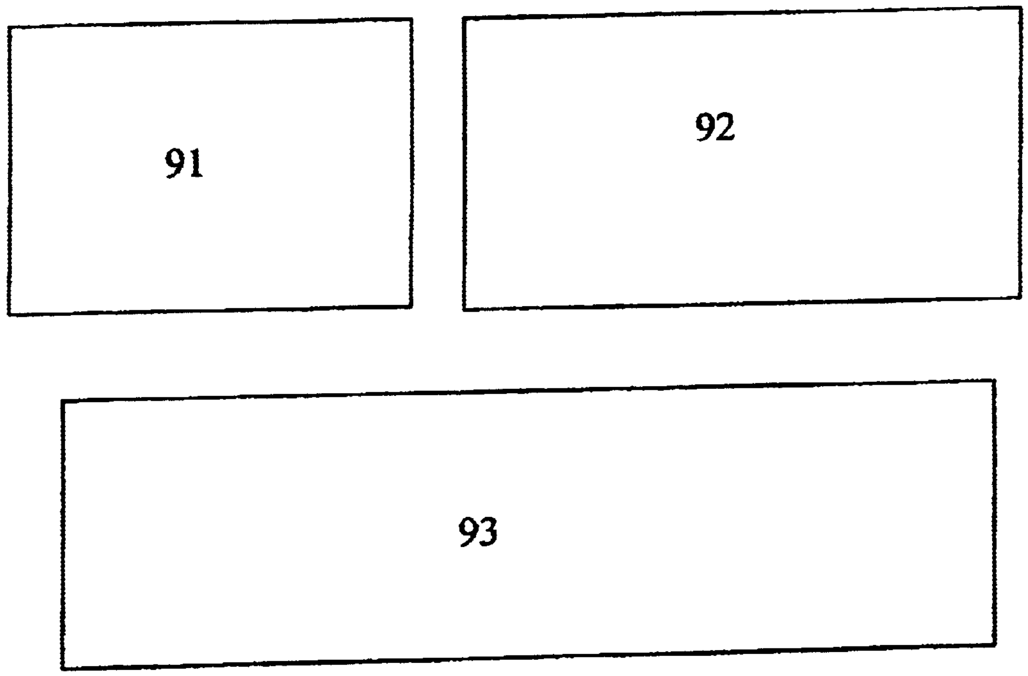
FIG. 8*a* depicts standard packing of pieces in a raw marker with large buffer space between pieces.
Figure 8B:
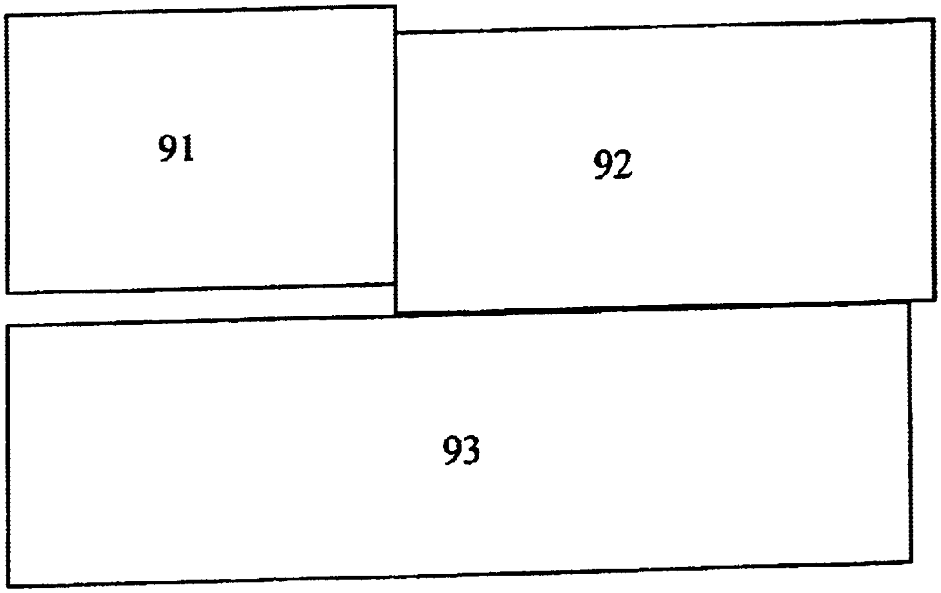
FIG. 8*b* depicts packing of pieces in a raw marker without buffer space between pieces.
Figure 8C:
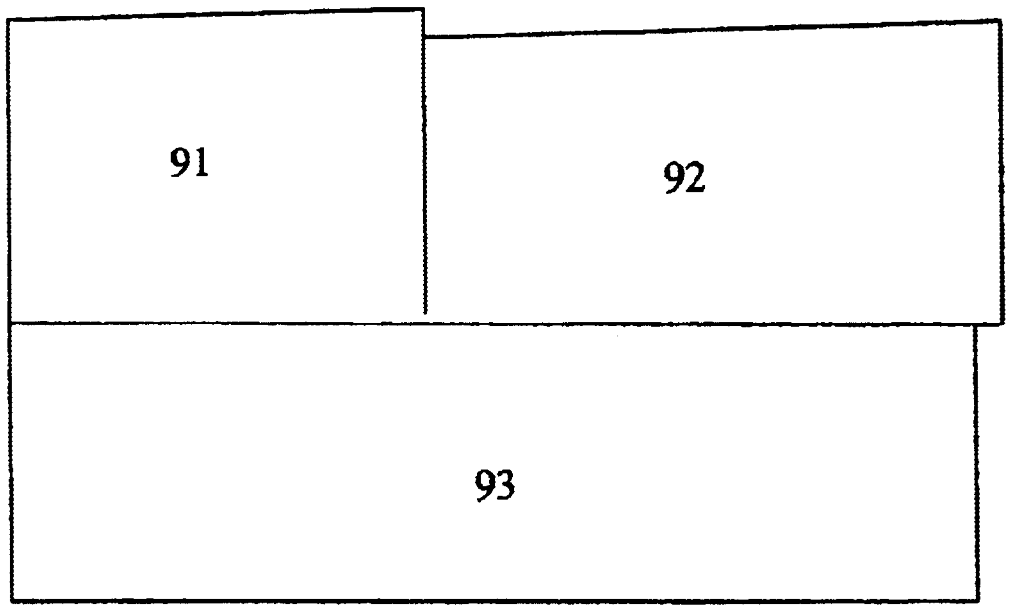
FIG. 8*c* depicts sample results of the common line processing, revealing a marker, presented in FIG. 8*b* after the common line problem has been resolved.

One of the modes of operation of the invention is as follows. A CAD operator generates raw NC data using CAD software by manually placing the pieces in the marker. While doing that she tries to pack pieces in the marker as tightly as possible. However, instead of following the standard (as of today) nesting rules, which would result in a marker shown at FIG. 8*a*, she decreases buffers, or spaces between templates 91 and 92, thus intentionally creating common lines, without paying much attention to possible common lines or tangencies. The raw marker with pieces nested according these new strategy is shown at FIG. 8*b*. Referring to FIG. 8*b* reveals the changes in the buffering strategy; as might be implemented by a CAD operator, with usual deviations from the ideal "common line" packing, with templates 91 and 92 having a common line between them. The NC data, defining this raw marker with little or no buffer space between pieces, are written to the file. After that the NC data pre-processor, running at another computer, reads that same file over the network. The CAM operator instructs the NC data pre-processor to detect and resolve tangencies and/or common lines. The NC data pre-processor does that, following the algorithm outlined in the description of the preferred embodiment of the current invention. An example of this "common line preprocessing" is shown in FIG. 8*c*, showing how templates 91 and 92 have been changed.

Then the NC data pre-processor estimates the resulting extra gain or loss in the productivity of the cutter, and, may be, quality of the marker, as a result of the tool path changes. If satisfied with the results, the CAM operator instructs the NC data pre-processor to write down the modified NC data into a new file. The cutter operator then instructs the numeric controller to read the new file, after which a cutting tool cuts the material under the control of the controller, following the modified tool path as recorded in the new file.

It is evident from the above-given description that various modes of the operation of the invention are possible, which will be different, for example, in different packaging of the software involved, number of operators involved and their level of expertise and/or authority, and, last but not least, the degree of the automation assumed.

Conclusion

The current invention provides a way to cut closely packed pieces from sheet material by intelligently preprocessing NC data before feeding them into the numerical controller. The closely packed pieces are cut without loss of accuracy or damaging the cutter, or frying the material, or substantially decreasing the cutter productivity, while drastically increasing the productivity of the operator and reducing the material waste. The current invention turns the difficulties of cutting of common lines to an advantage.

While the preferred embodiment of the present assumes that an automatic cutting machine with a knife as a cutting tool is used to cut pieces form limp sheet material, the present invention can also be used for cutting limp material with any other tool, including, but not limited to laser cutting. It can be also used for manual cutting, if a drawing, or a detailed computer image of the improved marker is used instead of numeric control data. The present invention can be also used for cutting solid materials with various cutting tools appropriate for the given material.

While the present invention has been described in several different embodiments, it should be understood that further modifications and substitutions could be made without departing from the spirit of the invention. Accordingly, the present invention has been described in several preferred forms merely by way of illustration rather than limitation. Though the description of the present invention contains many specifics, they should not be construed as limitations on the scope of the invention, but rather as an exemplification, many other variations being possible.

Therefore, the scope of the invention should be determined by the appended claims and their legal equivalents rather than any examples given.

We claim:

1. A method of cutting parts from sheet material comprising a numerically-controlled cutting system having a cutting tool for cutting along a path, the method comprising the steps of:

(a) placing a plurality of templates which define the shares and sizes of said parts upon said sheet material minimizing the spaces between said templates thereby forming a closely-packed marker;

(b) entering said marker into a pre-processor;

(c) detecting common lines and tangencies between templates in said marker;

(d) determining a path and speed for said cutting tool; and (e) directing the cutting tool in accordance with said path and speed wherein said parts are cut from said material, wherein said detecting common lines further comprises the steps of:

(a) detecting pairs of segments in proximity to each other;

(b) comparing an angle between said proximate segments of each said pair with a first critical angle,;

(c) clipping each segment of said pair by a belt rectangle of other segment if said angle between said proximate segments is less than said first critical angle, wherein the belt rectangle comprises four sides, and two of the four sides of the belt rectangle are parallel and equal in length to the other segment and located on opposite sides of that other segment;

(d) comparing the lengths of said clippings to a first maximum allowable critical distance; and (e) marking the segments as common line segments if the lengths of said clippings is greater than said first maximum allowable critical distance.

2. The method of cutting parts from sheet material as claimed in claim 1, further comprising the steps of:

(a) varying said first critical angle to obtain a second critical angle and said first maximum allowable critical distance to obtain a second critical distance;

(b) marking said proximate segments as tangent segments if said segments are not common line segments and if the clipped length is greater than the second critical distance and the angle between said proximate segments is less than the second critical angle.

3. The method of cutting parts from sheet material as claimed in claim 2 wherein the path and speed of said cutting tool are determined by a numerical control program.

4. The method of cutting parts from sheet material as claimed in claim 3, further comprising the steps of:

(a) sorting said templates into at least one subset such that all templates in each subset share a common line segment with only the templates therein;

(b) sorting said subsets into sub-subsets such that each common line segment belongs to only one sub-subset;

(c) approximating a common line for each common line segment; and (d) calculating the optimal tool path for each template containing said common line.

5. The method of cutting parts from sheet material as claimed in claim 4 further comprising the step of minimizing intra-piece dry haul time.

6. The method of cutting parts from sheet material as claimed in claim 4, wherein said common line is generated using a method selected from the group consisting of:

straight line approximation, polynomial interpolation, least squares fitting,

B-spline interpolation, cubic-spline interpolation, and a user-selected non-linear curve.

7. The method of cutting parts from sheet material as claimed in claim 5 wherein said minimizing intra-piece dry haul time comprises cutting at least a portion of internal lines of said marker prior to cutting perimeter lines thereof.

8. The method of cutting parts from sheet material as claimed in claim 2 wherein said path is used for manual cutting.

9. The method of cutting parts from sheet material as claimed in claim 8 wherein said common lines are cut in one pass.

10. The method of cutting parts from sheet material as claimed in claim 2 wherein said common lines are cut in one pass.

11. The method of cutting parts from sheet material as claimed in claim 10 wherein each common line is cut continuously without any dry haul and without removing and reinserting the cutting tool.

12. The method of cutting parts from sheet material as claimed in claim 10 wherein at least one of said common lines is approximated by a straight line.

13. The method of cuffing parts from sheet material as claimed in claim 10 wherein at least one of said common lines is approximated by a curved line.

14. The method of cutting parts from sheet material as claimed in claim 10 wherein at least one of said common lines is approximated by a sequence of a straight segments.

15. The method of cutting parts from sheet material as claimed in claim 2, wherein said closely-packed marker is generated using marker generation software.

16. The method of cutting parts from sheet material as claimed in claim 2, wherein said closely-packed marker is generated by scanning a physical model of said templates arranged within the area of said sheet material.

* * * * *